(12) United States Patent
Gupta

(10) Patent No.: US 11,102,689 B2
(45) Date of Patent: Aug. 24, 2021

(54) PACKET DATA CONNECTIONS IN A WIRELESS COMMUNICATION SYSTEM USING A WIRELESS LOCAL AREA NETWORK

(71) Applicant: Apple Inc., Cupertino, CA (US)

(72) Inventor: Vivek Gupta, San Jose, CA (US)

(73) Assignee: Apple Inc., Cupertino, CA (US)

(*) Notice: Subject to any disclaimer, the term of this patent is extended or adjusted under 35 U.S.C. 154(b) by 169 days.

(21) Appl. No.: 14/440,338

(22) PCT Filed: Dec. 20, 2013

(86) PCT No.: PCT/US2013/077231
§ 371 (c)(1),
(2) Date: May 1, 2015

(87) PCT Pub. No.: WO2014/107358
PCT Pub. Date: Jul. 10, 2014

(65) Prior Publication Data
US 2015/0282026 A1   Oct. 1, 2015

Related U.S. Application Data

(60) Provisional application No. 61/748,706, filed on Jan. 3, 2013.

(51) Int. Cl.
*H04W 36/14*   (2009.01)
*H04L 12/46*   (2006.01)
(Continued)

(52) U.S. Cl.
CPC ............ *H04W 36/14* (2013.01); *H04B 7/024* (2013.01); *H04B 7/0486* (2013.01);
(Continued)

(58) Field of Classification Search
CPC . H04W 36/14; H04W 76/023; H04W 76/021; H04L 61/2007; H04L 12/4641
See application file for complete search history.

(56) References Cited

U.S. PATENT DOCUMENTS

2009/0109986 A1 * 4/2009 Zhao ................. H04W 48/18
                                                    370/401
2011/0016309 A1   1/2011 Motoyama et al.
(Continued)

FOREIGN PATENT DOCUMENTS

CN   101119211 A   2/2008
CN   101159563 A   4/2008
(Continued)

OTHER PUBLICATIONS

International Search Report and Written Opinion dated Apr. 18, 2014 from International Application No. PCT/US2013/077231.
(Continued)

*Primary Examiner* — Charles C Jiang
*Assistant Examiner* — Voster Preval
(74) *Attorney, Agent, or Firm* — Eschweiler & Potashnik, LLC

(57) ABSTRACT

Connection control circuitry is provided for a User Equipment (UE) configurable to offload communication of packet data from a cellular radio-access network comprising a Trusted Wireless Local Access Network (TWLAN) and a Trusted Wireless Access Gateway (TWAG) with IP Address preservation. The connection control circuitry has a connection requesting module configured to send a distinguishable-connection establishment message to the TWAG, requesting setup of a TWAG-routed data connection comprising at least one of a Packet Data Network (PDN) connection and a Non-Seamless Wireless Offload (NSWO) connection. A unique virtual gateway interface address is used to identify a point-to-point link between the UE and the TWAG. This
(Continued)

allows the TWAG to distinguish between multiple substantially simultaneous point-to-point links which support multiple substantially simultaneous packet data connections. Other embodiments may be described and claimed.

24 Claims, 16 Drawing Sheets

(51) Int. Cl.

| | | |
|---|---|---|
| H04W 12/02 | (2009.01) | |
| H04L 1/00 | (2006.01) | |
| H04W 76/14 | (2018.01) | |
| H04W 76/11 | (2018.01) | |
| H04W 76/10 | (2018.01) | |
| H04B 7/024 | (2017.01) | |
| H04B 7/0456 | (2017.01) | |
| H04B 7/06 | (2006.01) | |
| H04J 11/00 | (2006.01) | |
| H04L 5/00 | (2006.01) | |
| H04L 29/12 | (2006.01) | |
| H04L 29/06 | (2006.01) | |
| H04W 24/10 | (2009.01) | |
| H04W 28/02 | (2009.01) | |
| H04W 36/00 | (2009.01) | |
| H04W 36/22 | (2009.01) | |
| H04W 48/08 | (2009.01) | |
| H04W 48/16 | (2009.01) | |
| H04W 52/02 | (2009.01) | |
| H04W 56/00 | (2009.01) | |
| H04W 68/00 | (2009.01) | |
| H04W 72/00 | (2009.01) | |
| H04W 72/04 | (2009.01) | |
| H04W 88/08 | (2009.01) | |
| H04W 88/06 | (2009.01) | |
| H04W 8/08 | (2009.01) | |
| H04W 84/12 | (2009.01) | |
| H04W 88/16 | (2009.01) | |

(52) U.S. Cl.
CPC ......... *H04B 7/0626* (2013.01); *H04B 7/0632* (2013.01); *H04J 11/0053* (2013.01); *H04L 1/0026* (2013.01); *H04L 5/0053* (2013.01); *H04L 12/4641* (2013.01); *H04L 61/2007* (2013.01); *H04L 63/304* (2013.01); *H04L 63/306* (2013.01); *H04W 12/02* (2013.01); *H04W 24/10* (2013.01); *H04W 28/0268* (2013.01); *H04W 36/0005* (2013.01); *H04W 36/0055* (2013.01); *H04W 36/22* (2013.01); *H04W 48/08* (2013.01); *H04W 48/16* (2013.01); *H04W 52/0222* (2013.01); *H04W 56/005* (2013.01); *H04W 56/0015* (2013.01); *H04W 56/0095* (2013.01); *H04W 68/00* (2013.01); *H04W 72/005* (2013.01); *H04W 72/042* (2013.01); *H04W 72/0413* (2013.01); *H04W 76/10* (2018.02); *H04W 76/11* (2018.02); *H04W 76/14* (2018.02); *H04W 88/08* (2013.01); *H04L 5/0057* (2013.01); *H04W 8/082* (2013.01); *H04W 36/0011* (2013.01); *H04W 84/12* (2013.01); *H04W 88/06* (2013.01); *H04W 88/16* (2013.01); *Y02D 30/70* (2020.08)

(56) References Cited

U.S. PATENT DOCUMENTS

| | | | |
|---|---|---|---|
| 2011/0099604 A1 | 4/2011 | Zhou et al. | |
| 2011/0171953 A1 | 7/2011 | Faccin et al. | |
| 2012/0284785 A1 | 11/2012 | Salkintzis et al. | |
| 2014/0036807 A1* | 2/2014 | Huang | H04L 61/2038 370/329 |
| 2014/0071969 A1* | 3/2014 | Roeland | H04W 40/02 370/338 |
| 2014/0078986 A1* | 3/2014 | Kaippallimalil | H04L 65/1069 370/329 |
| 2014/0086226 A1* | 3/2014 | Zhao | H04W 76/11 370/338 |
| 2014/0119353 A1* | 5/2014 | McCann | H04L 69/161 370/338 |
| 2015/0256323 A1* | 9/2015 | Gandarillas Diego | H04W 72/0453 370/281 |
| 2015/0296548 A1* | 10/2015 | Roeland | H04W 36/0022 370/329 |

FOREIGN PATENT DOCUMENTS

| | | |
|---|---|---|
| EP | 2533466 A1 | 12/2012 |
| EP | 2538721 A1 | 12/2012 |
| WO | WO2012066189 A1 | 5/2012 |
| WO | WO2012149954 A1 | 11/2012 |

OTHER PUBLICATIONS

International Preliminary Report on Patentability dated Apr. 9, 2015 from International Application No. PCT/US2013/077231.
3GPP TR 23.852 V1.3.0 (Nov. 2012); "Technical Specification Group Services and System Aspects; Study on S2a Mobility based on GTP & WLAN access to EPC (SaMOG); Stage 2 (Release 12)," 122 pages.
3GPP TS 23.401 V11.4.0 (Dec. 2012); "Technical Specification Group Services and System Aspects; General Packet Radio Service (GPRS) enhancements for Evolved Universal Terrestrial Radio Access Network (E-UTRAN) access (Release 11)," 284 pages.
3GPP TS 23.402 V11.5.0 (Dec. 2012); "Technical Specification Group Services and System Aspects; Architecture enhancements for non-3GPP accesses (Release 11)," 252 pages.
3GPP TS 24.008 V12.0.0 (Dec. 2012); "Technical Specification Group Core Network and Terminals; Mobile radio interface Layer 3 specification; Core network protocols; Stage 3 (Release 12)," 678 pages.
3GPP TS 29.274 V11.5.0 (Dec. 2012); "Technical Specification Group Core Network and Terminals; 3GPP Evolved Packet System (EPS); Evolved General Packet Radio Service (GPRS) Tunnelling Protocol for Control plane (GTPv2-C); Stage 3 (Release 11)," 227 pages.
3GPP TS 29.281 V11.5.0 (Dec. 2012); "Technical Specification Group Core Network and Terminals; General Packet Radio System (GPRS) Tunnelling Protocol User Plane (GTPv1-U) (Release 11)," 27 pages.
W. Simpson; "The Point-to-Point Protocol (PPP)," RFC: 1661, Jul. 1994; 54 pages.
L. Mamakos, et al.; "A Method for Transmitting PPP Over Ethernet (PPPoE)," RFC: 2516, Feb. 1999; 16 pages.
S. Cheshire, et al.; "Dynamic Configuration of IPv4 Link-Local Addresses," RFC: 3927, Microsystems May 2005; 33 pages.
J. Arkko et al.; "Extensible Authentication Protocol Method for 3rd Generation Authentication and Key Agreement (EAP-AKA)," RFC: 4187, Jan. 2006; 79 pages.
T. Narten et al.; "Neighbor Discovery for IP version 6 (IPv6)," RFC: 4861, Sep. 2007; 97 pages.
J. Arkko et al.; "Improved Extensible Authentication Protocol Method for 3rd Generation Authentication and Key Agreement (EAP-AKA')," RFC: 5448, May 2009; 29 pages.

(56) References Cited

OTHER PUBLICATIONS

S. Gundavelli et al.; "Address Mapping of IPv6 Multicast Packets on Ethernet," RFC: 6085, Jan. 2011; 3 pages.

Huawei, Hisilicon, Intel; "SaMOG Phase 2—APN/PDN Signalling," TD S2-124845, Agenda Item: 8.10; Work Item / Release: FS_SaMOG / Rel-12; 3GPP TSG SA WG2 Meeting #94, Nov. 12-16, 2012, New Orleans, USA; 12 pages.

IEE; "IEEE Standard for Information technology—Telecommunications and information exchange between systems—Local and metropolitan area networks—Specific requirements, Part 11: Wireless LAN Medium Access Control (MAC) and Physical Layer (PHY) Specifications," IEEE Std 802.11™—2007; Jun. 12, 2007 New York, NY 10016-5997, USA; 1232 pages.

IEE; "IEEE Standard for Ethernet"; IEEE Std 802.3™—2012, Dec. 28, 2012 New York, NY 10016-5997, USA; 634 pages.

Chinese Patent Office; Office Action issued for Patent Application No. 201380063153.4 dated Feb. 5, 2018; 13 pages.

Alcatel-Lucent, et al.; "Proposed solution for SAMOG phase 2," Agenda Item: 8.9, 3GPP TSG SA WG2 Meeting #93, S2-124846; New Orleans, USA—Nov. 12-16, 2012; 12 pages.

\* cited by examiner

PACKET DATA CONNECTIONS IN A WIRELESS COMMUNICATION SYSTEM USING A WIRELESS LOCAL AREA NETWORK

CROSS REFERENCE TO RELATED APPLICATIONS

The present application is a national phase entry under 35 U.S.C. § 371 of International Application No. PCT/US2013/077231, filed Dec. 20, 2013, entitled "PACKET DATA CONNECTIONS IN A WIRELESS COMMUNICATION SYSTEM USING A WIRELESS LOCAL AREA NETWORK", which designates the United States of America, which claims priority to U.S. Patent Application No. 61/748,706, filed Jan. 3, 2013, entitled "ADVANCED WIRELESS COMMUNICATIONS SYSTEMS AND TECHNIQUES." The entire disclosures of which are hereby incorporated by reference in their entireties for all purposes, except for those sections, if any, that are inconsistent with this specification.

TECHNICAL FIELD

Embodiments described herein generally relate to packet data connections in a wireless communication system using a Wireless Local Area Network (WLAN).

BACKGROUND

The demand for mobile data communication is increasing but the radio frequency spectrum available for mobile data communication is limited and Shannon's law provides that the highest obtainable error-free data speed is a function of the bandwidth and the signal-to-noise ratio. One way of increasing wireless network capacity is to make use of small cell technologies such as the Institute of Electrical and Electronic Engineers (IEEE) 802.11 standard commonly known as Wi-Fi. Network operators can use Wi-Fi by utilizing WLANs to offload a portion of mobile data traffic from the Third-Generation Partnership Project (3GPP) cellular wireless network to the non-3GPP Wi-Fi network. Long-Term Evolution (LTE) is one example of a 3GPP cellular wireless network. The core network architecture of LTE is an Evolved Packet Core (EPC) which uses Internet Protocol (IP) to transport voice and short messages (SMS) as well as to transport data.

3GPP differentiates Wi-Fi offloading between trusted Wi-Fi access and untrusted Wi-Fi access. Untrusted Wi-Fi access is provided based on a 3GPP S2b interface and does not provide over the air security based on IEEE 802.1x. Trusted Wi-Fi access generally relates to operator-based Wi-Fi access incorporating over-the-air encryption and secure authentication. Access to untrusted Wi-Fi networks is via Evolved Packet Data Gateway (ePDG). Access to trusted Wi-Fi networks is via Trusted WLAN Access Gateway (TWAG) and is being developed in 3GPP as part of "S2a Mobility based On GPRS Tunnelling Protocol (GTP) and WLAN access to EPC" (SaMOG) work-item in Rel-12. The current 3GPP release is Rel-11.

Demands upon cellular wireless networks have an ongoing and rapid upwards trend, so more efficient use of available bandwidth is desirable.

BRIEF DESCRIPTION OF THE DRAWINGS

Embodiments described herein are illustrated by way of example, and not by way of limitation, in the figures of the accompanying drawings in which like reference numerals refer to similar elements.

DESCRIPTION OF EMBODIMENTS

Figure 1:
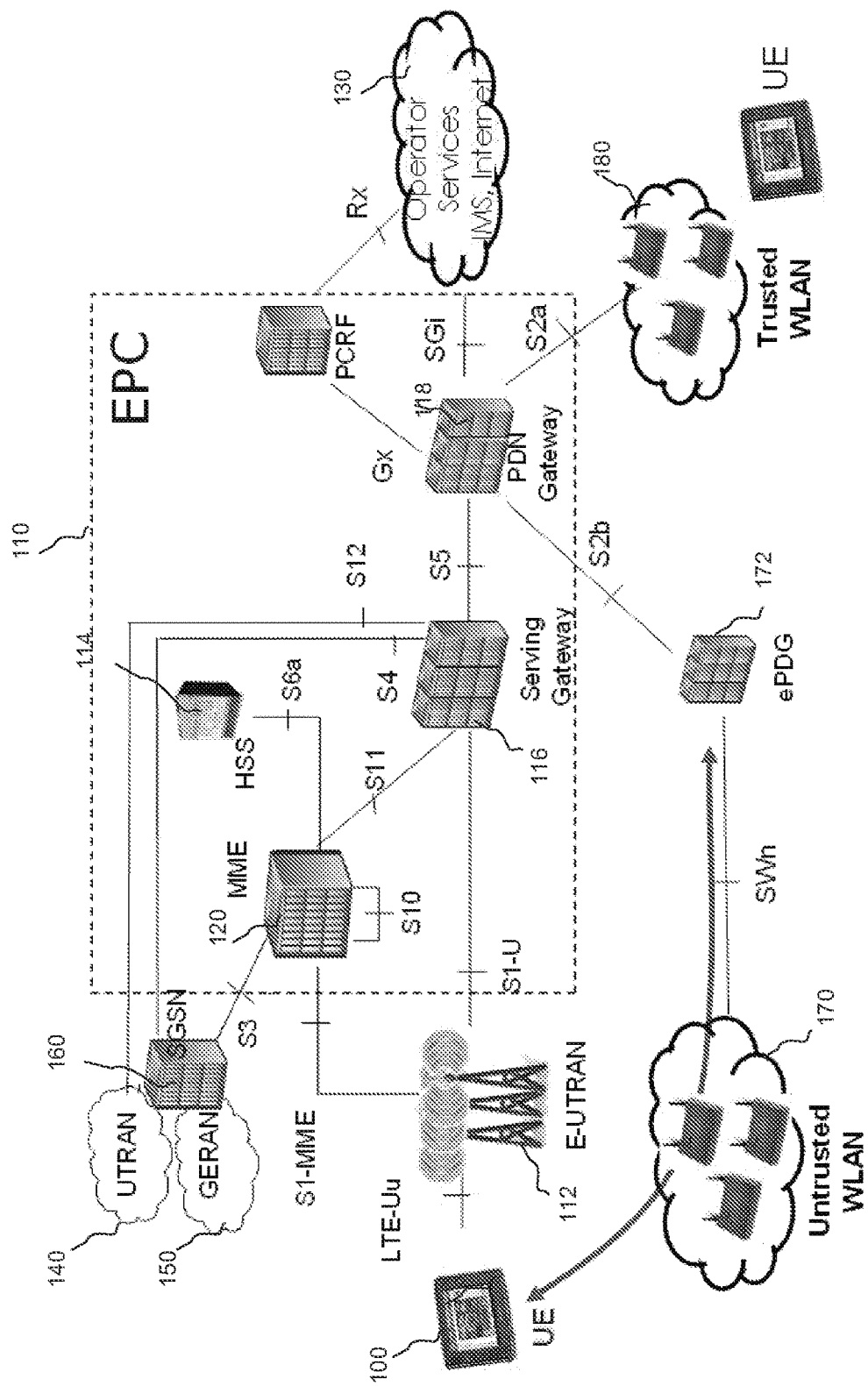
FIG. 1 schematically illustrates an LTE wireless communication system.

FIG. 1 schematically illustrates an LTE wireless communication system. The system comprises a User Equipment (UE) 100 connected to an EPC 110 over an Evolved Universal Terrestrial Radio Access Network (E-UTRAN) 112. The E-UTRAN 112 includes an eNodeB (not shown), which is the base station for LTE radio. The EPC 110 comprises four network elements: a Home Subscriber Server (HSS) 114; a serving gateway 116; a Packet Data Network (PDN) gateway 118; and a Mobility Management Entity (MME) 120. The HSS 114 is a database storing user and subscriber related data and provides support functions in call setup, user authentication and access authorization. The serving gateway 116 deals with user plane (rather than control plane) data and serves the UE 100 by routing incoming and outgoing IP packets and connects the cellular radio communication side to the EPC. The PDN gateway 118 also deals with user plane data and connects the EPC to external IP networks and may also perform IP address allocation, policy control and charging. The MME 120 handles control plane data and deals with signaling related to mobility and security for E-UTRAN access.

The EPC 110 may also be connected to external networks such as an Operator Services IP Multimedia Core Network Subsystem (Operator Services IMS) 130. 3GPP also specifies support for access to the EPC via radio access technologies pre-dating LTE as shown in FIG. 1, where the EPC is accessible to a UTRAN 140 and GSM EDGE radio network Access (GERAN) 150 via a Serving GPRS Support Node SGSN (160). GERAN 150 is the radio access network of GSM/GPRS and UTRAN 140 is the radio access network of UMTS-based technologies Wideband Code Division Multiple Access (WCDMA) and High Speed Packet Access (HSPA).

The wireless communication system of FIG. 1 also allows non-3GPP technologies to be connected to the UE 100 and the EPC 110. Non-3GPP technologies are those not currently specified by 3GPP standards and include, for example, WiMAX (IEEE 802.16), Wi-Fi (IEEE 802.11) or fixed networks. WiMAX has a wider range than Wi-Fi. As shown in FIG. 1, a UE can connect to the EPC 110 via an untrusted WLAN 170 by connecting via a "Swn" interface to an ePDG gateway 172 that connects to the PDN gateway 118 via an "S2b" interface. The ePDG gateway 172 provides security mechanisms such as IPsec tunneling of connections with the UE over an untrusted non-3GPP access. Due to the IPsec tunneling, the ePDG is effectively blind to the contents of a PDN connection passing through it. The UE 100, can also connect to the EPC 110 using a trusted WLAN 180, which communicates with the PDN gateway 118 via an "S2a" interface using a TWAG (not shown), which is part of the TWLAN and does not use an ePDG. Release 11 of the 3GPP LTE-A standard enables trusted WLAN access without requiring any modifications to the UE.

For the UE 100 to connect to the EPC 110, appropriate network nodes like the appropriate serving gateway 116 and the appropriate PDN gateway 118 have to be supported. To do this, an information element known as an Access Point Name (APN) is used to identify a target PDN and a protocol type towards the PDN gateway 118 (e.g. GPRS tunneling protocol). The APN specifies a mandatory network identifier, which defines the PDN to which the UE requests connectivity and may also specify a service requested by the UE. The APN also comprises an optional operator identifier, defining the specific operator's packet domain. When the UE 100 makes a data connection to the EPC 110, the connection is made by presenting an APN to the 3GPP network. The network can use the APN to determine the characteristics of the network connection and to determine which IP addresses should be assigned to the UE.

Figure 2:
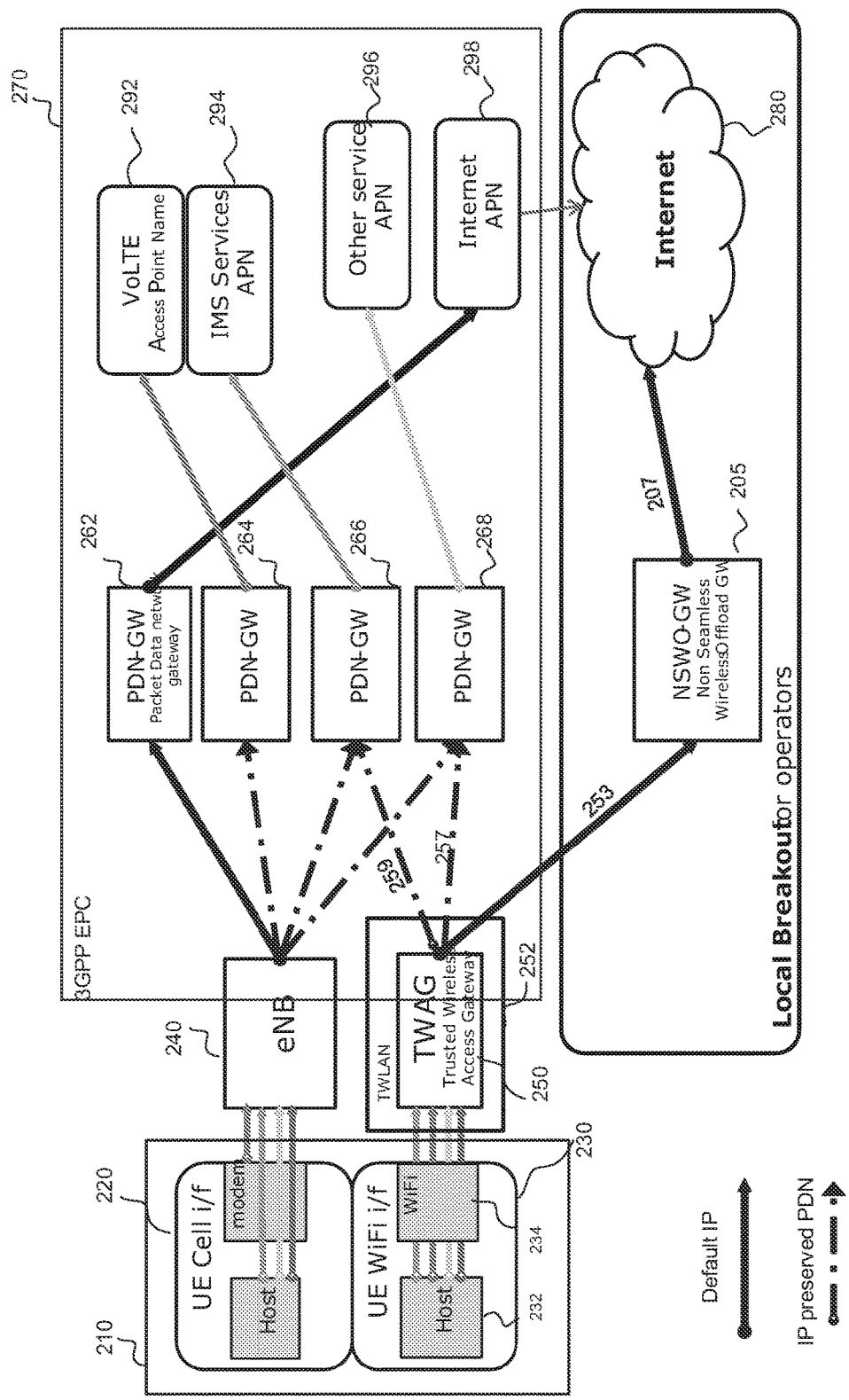
FIG. 2 schematically illustrates multiple Packet Data Network connections in a communication system having a non-3GPP wireless offload gateway.

FIG. 2 schematically illustrates multiple packet data connections in a wireless communication system implementing a 3GPP EPC 270 and utilizing a non-3GPP wireless offload gateway 205. In this FIG. 2 system a UE 210 comprises a UE cell interface 220 having a set of host circuitry 222 and a modem 224. The UE host circuitry 222 and modem 224 send and receive data to/from the eNodeB 240 via cellular radio communication. The eNodeB 240 is configured to have connections with a plurality of 3GPP PDN gateways 262, 264, 266, 268. A connection between eNodeB 240 and the PDN gateway 262 has an associated default IP address.

As well as communicating using a cellular radio interface 220, the UE may also be configured to communicate via a Wi-Fi interface comprising a Wi-Fi host 232 and a set of Wi-Fi communication circuitry 234 configured to communicate via Wi-Fi with a Trusted Wireless Access Gateway (TWAG) 250, which belongs to a Trusted Wireless Access Network (TWAN) 252. Both the eNodeB 240 and the TWAG 250 provide the UE with access to the 3GPP EPC 270 by setting up connections with one or more of the PDN gateways 262, 264, 266, 268. All connections between the eNodeB 240 and TWAG 250 and the PDN gateways 262, 264, 266, 268 are packet data communications based on Internet Protocol. The TWAG 250 also provides the UE with the ability to form an IP based communication link with the "Non-seamless Wireless Offload" Gateway (NSWO-GW) 205, which allows packet data traffic to be offloaded from the 3GPP network to an alternative non-3GPP communication system such as a Wi-Fi communication system. A "Seamless Wireless Offload" is an offload to WLAN that offloads data from the cellular wireless network by using the TWAG 250 (non-3GPP access) instead of the eNB 240 and passes it on to an a PDN gateway of the EPC. The term non-3GPP connection refers to a PDN connection over non-3GPP access, such as Wi-Fi, although note that the connection still goes through the EPC. An NSWO connection, although it goes through a non-3GPP access such as Wi-Fi, does not go through the EPC, so is generally not referred to as a PDN connection. A first communication channel 253 connects the TWAG 250 to a default IP address in the NSWO-GW 205 and a second communication channel 207 connects the NSWO-GW 205 to a default IP address on the Internet 280. Both of the communications 207 and 253 are non-3GPP communications, which do not use the EPC.

The PDN gateways 262, 264, 266, 268 allow the UE 210 to connect to a plurality of different packet-based services such as a Voice over LTE APN 292, an IP Multimedia Subsystem (IMS) services APN 294, a generic APN for a service 296 and an Internet APN 298 that provides access to the public Internet, which lies outside the 3GPP EPC 270.

As shown in FIG. 2, in the case of Non-Seamless WLAN Offloading (NSWO), the UE 210 connects via the Trusted WLAN access 252 and traffic is routed from the TWLAN 252 directly to the target network, in this case the Internet 280, without passing through one of the EPC PDN gateways 262, 264, 266, 268. Whereas in case of seamless offloading the traffic is routed from the trusted WLAN access to the target network through the PDN-GWs which connect to a specific Packet Data network and the traffic in this case goes through the 3GPP EPC. In previously known systems, when traffic through WLAN access was routed through the EPC, there was no support for mobility (IP address preservation) when moving PDN connections from TWLAN access 252 to 3GPP access (e.g. eNodeB) or when switching from TWLAN access to 3GPPaccess. The UE 210 is allocated an IP address(es) received from any of the PDN gateways 262, 262, 266, 268 associated with PDN connections. In the arrangement of FIG. 2, the UE 210 has a NSWO connection 253 substantially simultaneously along with having an active connection 257 with the PDN gateway 268 connecting to the other service APN 296 and an active connection 259 with the PDN gateway 266 providing a communication pathway with the IMS services APN 294.

In SaMOG as described in 3GPP Release 11 of the LTE standards, it is not possible to use the TWLAN 252 to simultaneously route the network through the EPC network via one of the PDN gateways 262, 264, 266, 268 and to access a target network such as the Internet 280 or an intranet (not shown) via the local NSWO-GW 205, with the traffic not being routed through the 3GPP EPC. Furthermore, in previously known systems only a single connection to an EPC PDN gateway could be made at a given time via the TWLAN 252. However, according to the present technique, multiple substantially simultaneous PDN gateway connections can be established via the TWLAN 252 as shown in FIG. 2. Also, the TWLAN 252 can be used to simultaneously access the Internet 280 via the NSWO-GW 205 and access one or more of the EPC PDN gateways 262, 264, 266, 268. According to the present technique, a control plane protocol and user plane protocol and associated hardware and/or software are provided to support the following capabilities:

For a UE 210, multiple simultaneous PDN connections over Trusted WLAN 252 are supported, including the support for establishment of concurrent PDN Connections via 3GPP access and over WLAN.

For a UE 210, PDN Connectivity to EPC over Trusted WLAN 252 concurrent with non-seamless WLAN off-load (NSWO) is supported.

The UE 210 is capable of IP address preservation in case of mobility between a 3GPP access (using the eNodeB 240) and a Trusted WLAN 252. The UE is capable to request IP address preservation per PDN connection in case of mobility between a 3GPP access and a Trusted WLAN.

The UE 210 is capable of signaling the requested APN over Trusted WLAN, and the UE is capable of receiving the selected APN over Trusted WLAN 252 (e.g. in case the UE 210 did not indicate an APN).

The UE is capable of indicating whether it requests a PDN connection or a NSWO service over Trusted WLAN, and the UE is capable of receiving an indication of whether the granted service is a PDN connection or NSWO (e.g. in case the UE did not indicate the kind of service it was requesting).

The present technique provides a control plane solution based on L2 action frames of the Institute of Electrical and Electronic engineers (IEEE) 802.11 standard and a new GAS (Generic Advertisement Protocol) for SaMOG work-item in Rel-12. Please refer to contribution S2-124845 submitted to 3GPP SA2 Meeting #94 12-16 Nov. 2012 (TR 23.852) and available from http://www.3gpp.org/DynaReport/TDocExMtg-S2-94-29667.htm for further details/reference.

In the FIG. 2 arrangement, the ability to establish and maintain a plurality of substantially simultaneous communication links between the UE 210 and the TWLAN 252 may depend upon both the configuration of the UE 210 and the configuration of the TWLAN 252. For example, the TWLAN 252 may support multiple substantially PDN gateway connections at the same time as a direct connection to the NSWO-GW 205, but the UE 210 may only be configured to support a single packet data connection using the TWLAN 252 at a given time. Alternatively, the UE 220 may be configured to support multiple simultaneous connections whereas the TWLAN 252 may only be configured to support a single packet data connection with the UE 210 at any given time. Some particular examples of use cases illustrating how the compatibility of wireless access configuration between the TWLAN 252 and the UE 210 may have an impact upon the experience of the user are as follows.

1. 3GPP Release-11 SaMOG via Default PDN only

UE 210 user is talking on a smart phone before arriving at airport where his operator-X also provides TWAN service.

However, the UE cannot handover his voice call using airport's TWAN 252 because UE supports only Rel-11 SaMOG regardless of whether or not the airport supports Rel-11/12 SaMOG TWAN. If the UE wants to make a "new" voice call over the TWLAN 252, it can do so. However, the UE cannot perform an online map view or check email online while he is talking on the phone over the TWLAN 252 because NSWO is not allowed during the voice call.

2. 3GPP Release-12 SaMOG Single PDN via Default or non-Default PDN (UE-impacted)

UE 210 user is talking on his smart phone before arriving to the airport where his operator-"X" also provides a TWAN service. UE 210 can handover his voice call over to airport's TWLAN because the UE supports either Rel-12 single-PDN SaMOG and the airport also supports Rel-12 single-PDN SaMOG TWAN. Note that Release 12 or Phase 2 SaMOG relates to embodiments described herein such as the embodiment of FIG. 2. However, the UE 210 cannot do a Google MAP or checking email online while he is talking on the phone over the TWAN because NSWO is not allowed during the voice call—only a single connection is allowed.

3. Rel-12 SaMOG Multiple PDNs via Default or non-Default PDN (UE-impacted)

UE 210 user is talking on his smart phone before arriving to the airport where his operator-X also provides a TWLAN service. The UE can handover his voice call using airport's TWAN because UE supports Rel-12 single-PDN or multi-PDN SaMOG and the airport also supports Rel-12 multiple-PDN SaMOG TWAN. The UE can do a Google MAP and checking email online while he is talking on the phone over the TWAN because NSWO is allowed during the voice call—multiple PDN connections are allowed.

Figure 3:
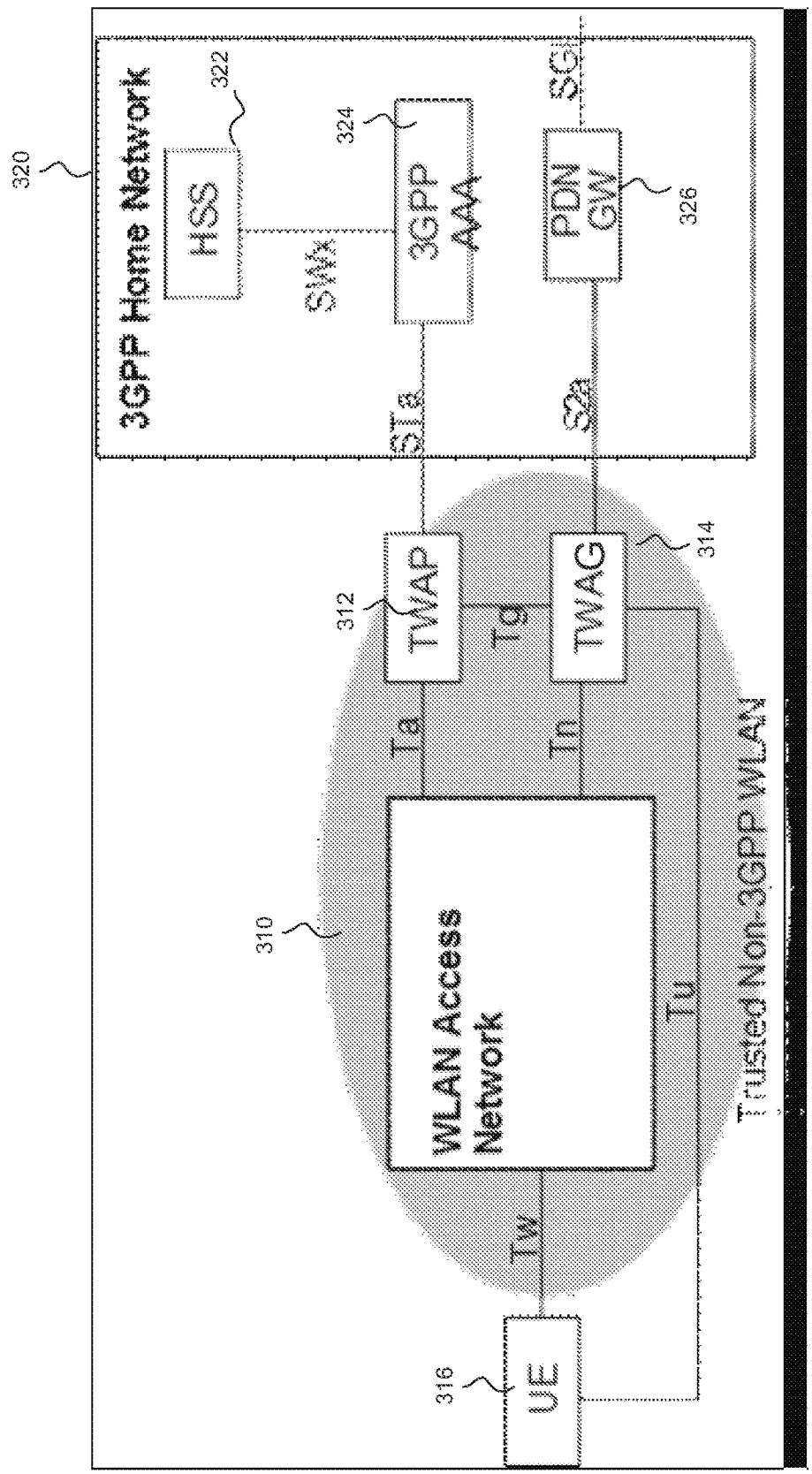
FIG. 3 schematically illustrates Trusted WLAN (TWLAN) access to 3GPP EPC.

FIG. 3 schematically illustrates a non-roaming reference model for TWLAN access to the 3GPP EPC. In contrast to the arrangement of FIG. 1, where the 3GPP EPC belongs to a public network, in FIG. 3 the 3GPP EPC corresponds to a home network. The FIG. 3 system comprises a TWLAN access network 310 (non-3GPP) connected to a 3GPP home network 320. The 3GPP home network 320 comprises an HSS 322, a 3GPP Authentication, Authorization and Accounting (AAA) server 324 and a PDN gateway 326. The TWLAN 310 comprises a Trusted WLAN Access Proxy (TWAP) 312 that connects to the 3GPP AAA server 324 of the 3GPP Home Network via an STa interface and a Trusted WLAN Access Gateway (TWAG) 314 that connects to the PDN gateway 326 of the home network via an S2a interface. The STa interface serves to perform functions including authenticating and authorizing a user when the user attaches to a trusted non-3GPP access such as the TWLAN 310 and transporting mobility parameters required for the S2a interface between the TWAG 314 and the 3GPP PDN gateway 326, for example when a protocol such as Proxy Mobile IPv6 or Mobile IPv4 is used to connect a UE 316 to the EPC (not shown) of the 3GPP home network 320.

Note that the criteria for treating a non-3GPP access as trusted is based on a decision by the operator on whether the non-3GPP security features are sufficiently secure rather than based on the access technology type. When the UE 316 performs a trusted non-3GPP access, an access authentication process is implemented based on a revision of Extensible Authentication protocol Authentication and Key Agreement (EAP-AKA) known as EAP-AKA' and specified in Internet Engineering Task Force (IETF) RFC 5448. In the EAP protocol architecture there is: an EAP peer requesting access to the network (e.g. the UE); an authenticator for performing access control (e.g. the TWLAN access point); and an EAP server (in Evolved Packet System this is the 3GPP AAA server e.g. 324 in FIG. 3).

The WLAN Access Point (AP) is the termination of the IEEE 802.11 air interface between the UE and the WLAN network. When EAP is used for network access control, the authentication is performed before the UE is allowed access to the 3GPP EPC and before the UE 316 is provided with IP connectivity. EAP messages between the UE and the TWLAN access point (which sits on an interface between the UE 316 and the TWAG 314) are used to carry the AAA protocol messages in an underlying transport protocol that is specific to the access type, whereas EAP messages between the TWLAN access point and the 3GPP AAA server 324 are carried using the STa interface. EAP-AKA' allows AKA-based authentication to be performed over an access even if there is no native support for it in the particular access. This allows the trusted non-3GPP access network to perform 3GPP-based authentication with a shared secret key, K, being located in a Universal Subscriber identity module (USIM) and the HSS Authentication Centre.

Figure 4:
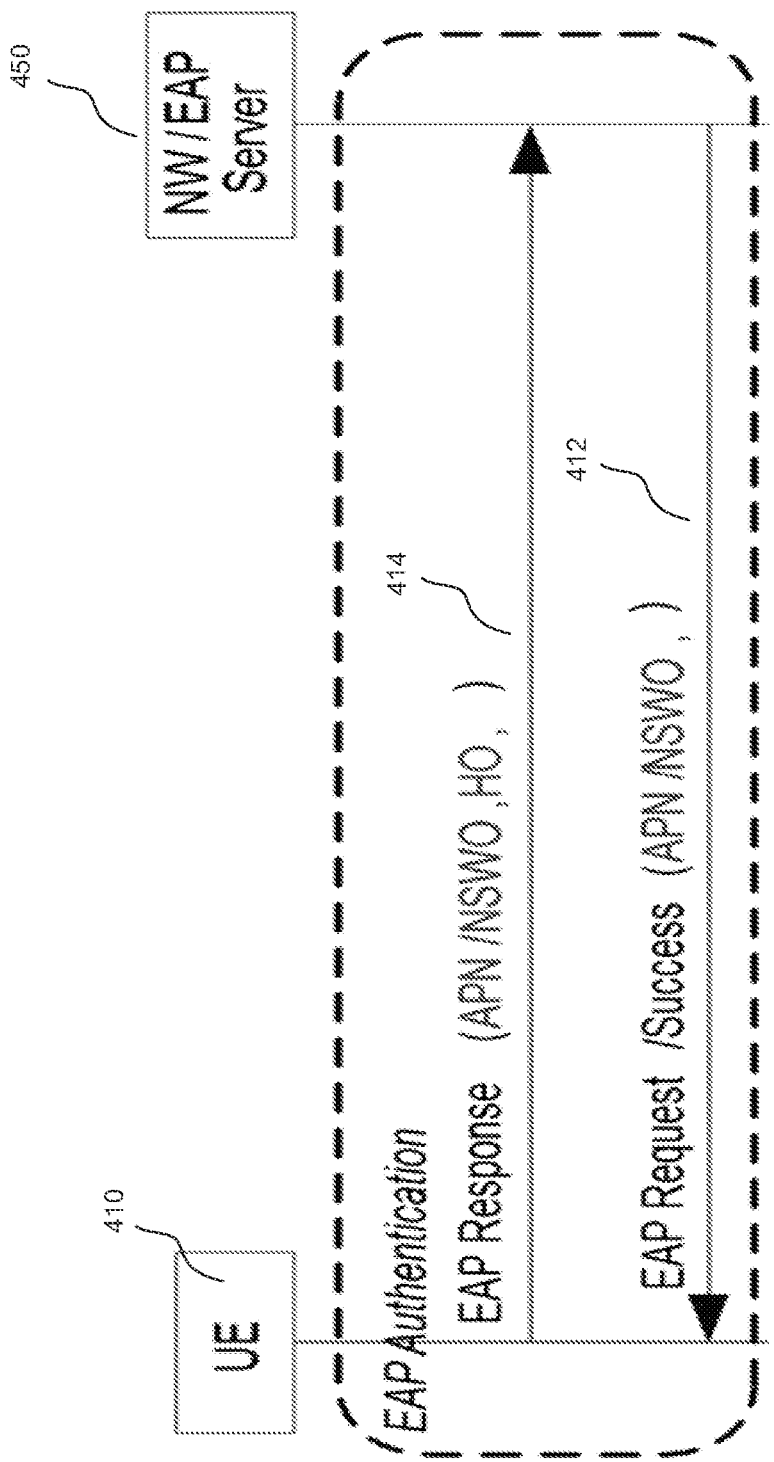
FIG. 4 schematically illustrates a capability negotiation between a UE and a TWLAN.

FIG. 4 schematically illustrates a capability negotiation between a UE 410 and a TWLAN 450 as part of an EAP authentication. According to the present technique, conventional EAP signaling is enhanced to carry "attach parameters" specifying attributes associated with the requested connection. Examples of attach parameters include an Access Point Name specifying a connection required by the UE 410, a parameter indicating if the connection relates to a NSWO and a handover indicator specifying if the connection relates to a handover between a 3GPP EPC access (routed through an eNodeB) and a non-3GPP access (Wi-Fi). As part of the capability negotiation, the UE indicates its capability to perform SaMOG procedures and the Network (e.g. TWLAN 450) specifies whether or not it can support the UE capabilities. Examples of capabilities include an ability to support a plurality of substantially simultaneous PDN gateway connections formed via the TWAG and an ability to perform NSWO by forming a connection from the TWAG to an NSWO gateway without using a 3GPP PDN gateway as an intermediary (as shown in FIG. 2).

FIG. 4 shows a UE 410 performing an authentication with a network/EAP server 450. FIG. 4 has been simplified for illustrative purposes and does not show an EAP authenticator (WLAN access point). The EAP authenticator (not shown) acts as an intermediary for EAP message exchange between the UE (EAP peer) 410 and the EAP server (3GPP AAA Server) 450. As shown in FIG. 4, an EAP Request message 412 and an EAP response message 414 that are communicated between the UE 410 and the EAP server 450 are configured to carry attach parameters comprising an APN parameter, an NSWO parameter and an HO (handover) parameter.

In 3GPP, the EPC provides a UE 410 with IP connectivity for both data and voice services because when using E-UTRAN (see FIG. 1) only an IP-based packet switched domain and no circuit-switched domain is natively supported. IP connectivity may be provided to the UE towards a certain IP network, which could be the Internet, but may alternatively be an operator-specific IP network, providing services such as IP Multimedia Subsystem (IMS). Thus there may be an Internet PDN and a different IMS PDN. The IP connectivity may also be configured to provide a guaranteed bit rate or to allow prioritized treatment relative to other connections. According to the present technique, a UE 410 may access a single PDN at any given time or could have multiple PDN connections open substantially simultaneously (e.g. Internet and IMS deployed on different PDNs). Each PDN has its own IP address (or two addresses if both IPv4 and IPv6 are used). IP infrastructure and applications on both the Internet and private networks mostly use the 32-bit addresses of IPv4. IPv6 addresses are 128 bits long so provide many more addresses than IPv4, but IPv4 and IPv6 are incompatible due to a different packet header format used in IPv6. One PDN connection is always established when the UE 410 performs an initial attach to the EPC and, during this attach procedure, the UE 410 may provide an APN character string containing a reference to a PDN where services desired by a user are located. The APN is used to select the PDN for which to set up the connection and to select the PDN gateway. Additional PDN connections may be added by the UE once the initial attachment has been established.

PDN Control Protocol

The PDN control protocol b/w UE and TWAG is used to signal APN/PDN information between the UE and the AAA server 450 by also using the STa interface b/w TWAG and AAA server. This protocol also associates the APN/NSWO connection request to a distinct gateway IP address/MAC address prior to IP configuration using Dynamic Host Configuration Protocol (DHCP) and Router Solicitation/Router Advertisement (RS/RA). Note that an APN/NSWO connection may be alternatively referred to, for example, as a Trusted WLAN connection or a 3GPP/non-3GPP connection. The gateway IP address is derived from the Medium Access Control (MAC) address and there is a 1:1 association between the distinct gateway MAC address and the gateway IP address. For IP configuration signaling using DHCP or RS/RA, the TWAG 252 (see FIG. 2) can uniquely associate a UEs PDN connection using both: (i) a UE MAC address (or IPv6 link layer address); and (ii) the gateway interface (IP address, virtual MAC address) that is distinct for each PDN connection of the UE. Both of these parameters are required for inbound and outbound traffic.

For an IPv4 state-full address configuration, the UE 210 (see FIG. 2) provides a PDN connection request and the TWAG 252 returns this distinct gateway IP address as input for server-identity in a DHCP request. In the subsequent DHCP Request from UE to the TWAG 252, the server-identity is populated with this distinct gateway IP address as a means for the TWAG 252 to identify the PDN connection.

For IPv6 stateless address configuration, the UE 210 provides an PDN connection request and the TWAG 252 returns this distinct gateway IP address and also populates the same gateway IP address in a Router Advertisement that follows. For cases where the UE needs to send a Router Solicitation (optional), the TWAG 252 also returns a transient multicast address corresponding to this PDN connection that the TWAG 252 listens to. The UE may send a Router Solicitation with destination address set to this transient multicast address that is distinct for the corresponding PDN connection.

If the UE 210 of FIG. 2 requests handover from 3GPP EPC 276 to TWLAN 205 access, it indicates handover attach in a control protocol. If the UE 210 needs to setup a second PDN connection, this may be signaled in a subsequent connection setup request to the TWAG 252. For disconnection of a PDN connection, either the UE 210 or the TWLAN 252 may notify the other about an IP address/prefix that is released. The notified entity can then release the local connection resources.

The PDN Control Protocol (or TWLAN control protocol) described above consists of requests and/or responses or notification messages and requires a transport for these messages.

Transport for PDN Control Protocol

Several alternative methods of transports may be used for PDN control protocol.

PDN Transport Mechanism A

IEEE 802.11 (MAC and physical layer for WLAN) "L2 frames" (Ethernet frames) can be used to carry the PDN control protocol messages similar to the transport of ANQP/GAS between the UE the WLAN Access Point.

The PDN Control protocol may be defined as a new Generic Advertisement Service (GAS) protocol in Wi-Fi Alliance (WFA) as part of HotSpot (HS) 2.0 Release-3 specifications. The protocol would use the Wireless Mesh Network (WNM) Notification Action frames as a L2 transport over the IEEE 802.11 air interface. The GAS protocol provides Layer 2 transport of an advertisement protocol's frames between a mobile device and a server in the network prior to authentication.

Several options are available for carrying the control frames from a TWLAN Access Point (AP) (situated between the UE and the TWAG, for which see FIG. 11) to TWAG.

Remote Authentication Dial In User Service (RADIUS) or other similar protocol may be used for this purpose. Reliability of this control sequence is provided using IEEE 802.11 GAS and the backhaul protocol (e.g. RADIUS). Re-transmission timers re-use the DHCP re-transmission timer value. No fragmentation is expected as the signaling is expected to be well below the size of an Ethernet frame. In addition, RADIUS protocol messages Accept-Request/Response (for PDN Request/Response) and Change-of-Authorization (for Notification) should carry this protocol from AP to TWAN controllers. This underlying mechanism provides a reliable control protocol transport. The DHCP re-transmission timer values may be used.

Apart from RADIUS other options such as a Simple Object Access Protocol (SOAP) based message sequence, or an "ethertype" (or EtherType) based L2 encapsulation may also be used may also be used for communication between AP and the TWAG. An ethertype is, for example, a two-octet field in an Ethernet frame. The ethertype is used to indicate which protocol is encapsulated in the payload of an Ethernet Frame. This field was first defined by the Ethernet II framing networking standard, and later adapted for the IEEE 802.3 Ethernet networking standard. Examples of known ethertypes are IPv4, IPv6 and Address Resolution Protocol (ARP).

PDN Transport Mechanism B

An L2 protocol based on allocation of a new ethertype may also be used for communication between the UE and the TWAG. The control messages may be encapsulated in the ethertype frames which would just pass through the AP and arrive at the TWAG.

PDN Transport Mechanism C

An L3 (IP based) protocol may also be used for communication between the UE and the TWAG. For example User Datagram Protocol, Transmission Control Protocol or a Point to Point Protocol.

The UE may, in some embodiments, expect a local IP address (independently from whether NSWO is allowed or not) or the TWAG could allocate the IP Address. If NSWO is not allowed, the UE may get a local IP address and NSWO traffic would be blocked via Radius Change of Authorization (CoA).

Figure 5:
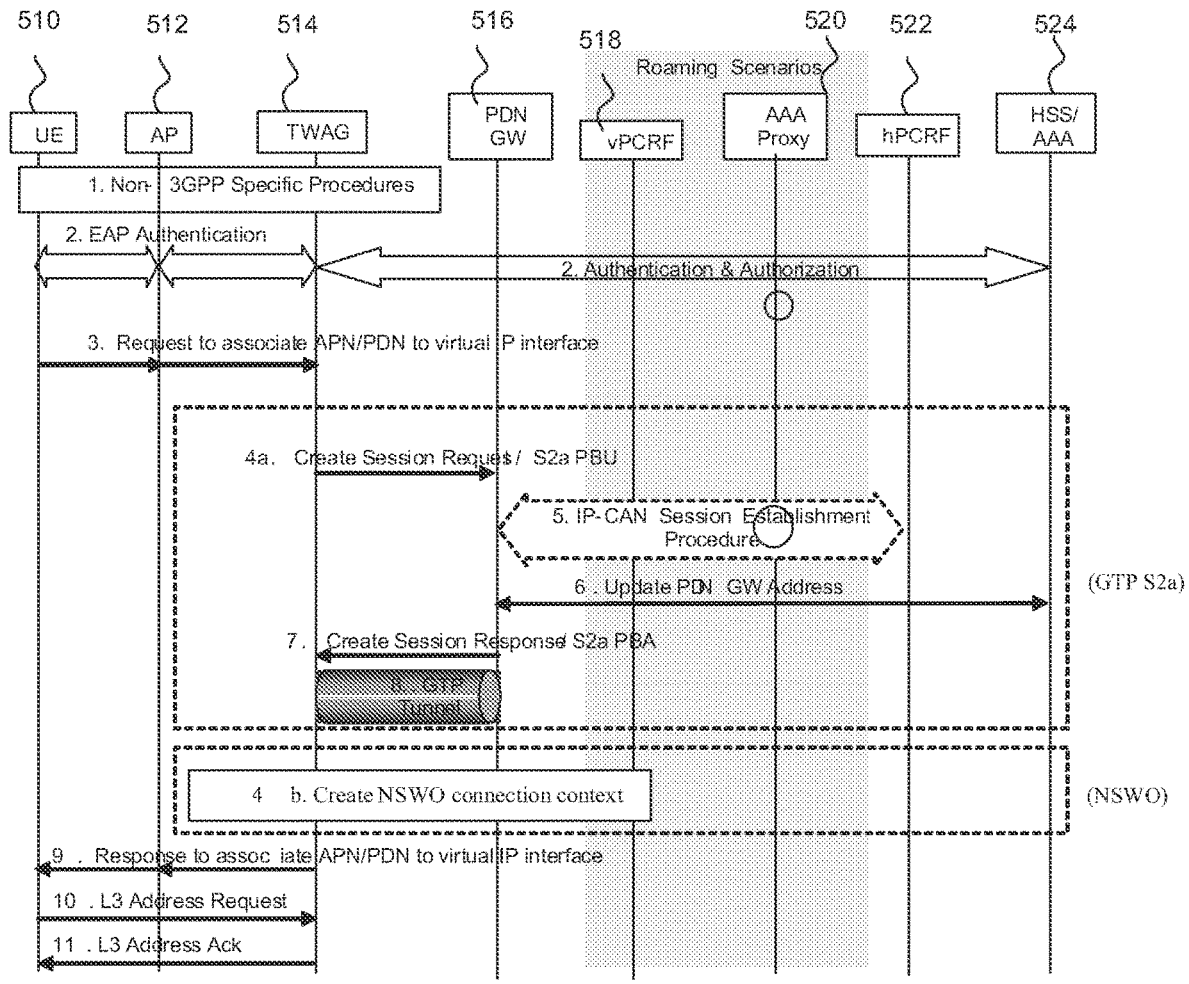
FIG. 5 schematically illustrates an attach procedure for setup of multiple PDN connections.
Figure 6:
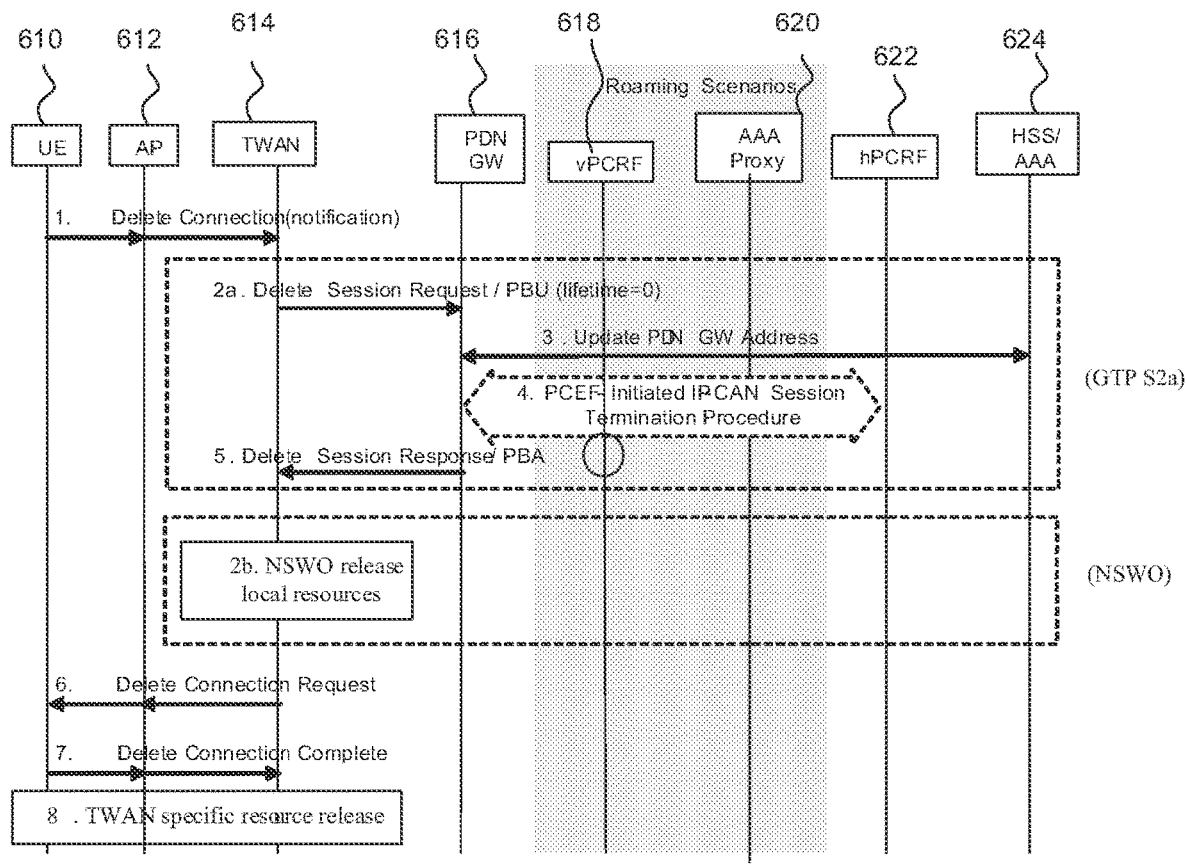
FIG. 6 schematically illustrates a UE-initiated disconnection procedure for TWLAN established connections.
Figure 7:
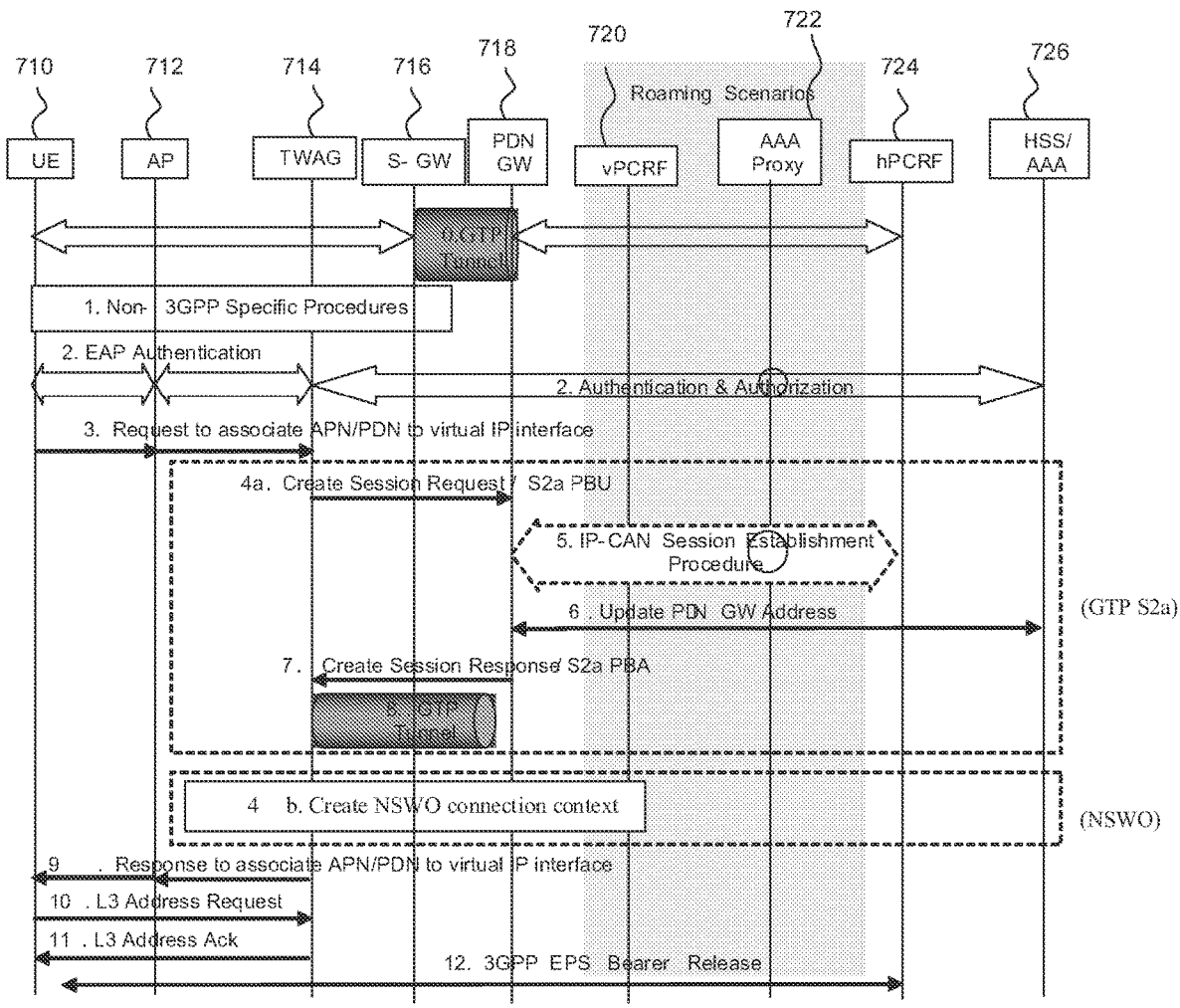
FIG. 7 schematically illustrates a handover procedure.

FIG. 5 schematically illustrates an attach procedure for setup of multiple PDN connections and non-3GPP packet data connections. FIG. 6 schematically illustrates a disconnection procedure for already established PDN and non-3GPP packet data connections. FIG. 7 schematically illustrates a handover procedure from 3GPP access to non-3GPP access (in this example TWLAN access). FIGS. 5 to 7 all involve the 3GPP S2a interface (see FIG. 1) between a Trusted non-3GPP Access Gateway and a 3GPP PDN gateway.

A new set of messages can be defined for use in the communications illustrated in any of FIGS. 5 to 7 as part of a new PDN control protocol. Alternatively, PDN connection setup messages as defined in IEEEE TS 24.008 may also be used for connection setup and teardown. Any of the above defined PDN transport mechanisms A to C may be used in the message sequences of FIGS. 5, 6 and 7.

The connection establishment procedures below support both Non-3GPP PDN connection establishment (PDN connection goes through EPC over Non-3GPP access) and NSWO connections (which do not go through the EPC at all) using a TWLAN (rather than an eNodeB). In the case of Non-3GPP PDN connections, the signaling from UE to TWAG explicitly provides the APN to which the UE wishes to connect. For NSWO connections, the UE indicates in an NSWO request or signal that it wants a local IP address.

FIG. 5 schematically illustrates a message sequence for a UE attach procedure for setting up EPC PDN connections and NSWO connections. Elements of the wireless communication network shown in FIG. 5 are: a UE 510; an Access point (AP) 512, which may correspond to a Trusted wireless Access Network; a TWAG 514; a 3GPP PDN gateway 516; a Visited Policy and Charging Rules Function (v-PCRF) 518; an AAA proxy 520; a home PCRF (h-PCRF) 522; and an HSS/AAA 524. FIG. 5 illustrates a roaming scenario, so an AAA proxy 520 is used rather than the AAA server (not shown) that would be used for a non-roaming scenario. The v-PCRF 518 is also used due to the roaming scenario.

The procedure to attach PDN or NSWO for a trusted WLAN access is represented in FIG. 5 and is described below using numbered process elements matching those in FIG. 5:

1. Some initial TWLAN specific L2 procedures are performed. These procedures are TWLAN specific and outside the scope of 3GPP.

2. EAP authentication procedures are performed. During this sequence, support of Phase 2 by the UE 510 and TWAG 514 are conveyed using EAP-AKA [RFC 4187] extensions. The UE and TWAG will be considered to be SaMOG "phase 2 compliant" if they support EPC-routed data, handover between 3GPP and non-3GPP and multiple PDN and or NSWO connections. If the UE 510 and TWAG 514 are found to be Phase 2 compliant, the UE 510 and TWAG 514 setup and exchange keys to be used to provide integrity protection (e.g. checksum hash) for the subsequent signaling setup messages. After successful authentication, the UE 510 sets up a link-local address for IPv4 (IETF RFC 3927), or follows the procedure in IETF RFC 4861 to setup an IPv6 link local address. The TWAG 514 replies with a control-initialize message with a source router IP, MAC address that UE can use in subsequent requests.

The TWAG allocates a local virtual MAC address on a per UE and per PDN connection basis. This local virtual MAC address is used later to correlate user plane traffic on a per UE and per PDN connection basis. It can uniquely distinguish a given connection from any other connections made by any UE connected to a TWAG, i.e. between a plurality of connections from the same UE or between connections with the same TWAG originating from different UEs. It is also used later on to tear down the connection etc. This identifier may be generally referred to as a unique virtual gateway interface address. It will be appreciated that this may be implemented in a variety of different ways provided that it provides the TWAG with the ability to distinguish between a plurality of substantially simultaneous connections. 3. The UE 510 sends a request with an APN, other PDN signaling parameters (e.g. initial attach, subsequent connection, handover indication) to the TWAN (not shown) via the TWAG 514 to setup a PDN and/or NSWO connection. Any of the above defined transport mechanisms may be used.

4. Process elements 4a-7 are performed as specified in TS 23.402, sub clause 16.2.1, steps 3-7 for PDN connection establishment for GTP S2a. In the FIG. 5 example, GTP is used and the TWAN/TWAG 514 sends a Create Session Request to the PDN gateway 516. The PDN gateway 516 creates a PDN connection, allocates an IPv4 address for the UE, and initiates IP Connectivity Access Network (IP-CAN) session establishment with the vPCRF 518. The PDN gateway 516 also sends the PDN gateway identity to the HSS/AAA server 524. The PDN gateway 516 replies to the TWAG 514 Create Session Request (process element 2a) by sending to the TWAG 514 a Create Session Response (process element 7), including the IPv4 address allocated by the PDN gateway 516 to the UE and the requested APN. This completes setup of a "GTP Tunnel" at process element 8 of FIG. 5. The TWAN/TWAG 514 then completes the DHCPv4 procedure with the UE 510 and provides the UE 510 with the IP address allocated to it by the PDN gateway 516 at process element 4*a*. All user data sent to/from the UE 510 is forwarded inside the GTP tunnel on the 3GPP S2a interface.

For the NSWO connection (non-3GPP), process element 4*b*, the TWAG 514 assigns local connection resources (gateway IP address, subnet, etc.) for the connection.

9. The TLWAN (not shown)/TWAG 514 assigns a distinct IPv4 gateway address corresponding to the APN/NSWO (i.e. TWLAN connection) and responds with this address in server-identity and router address for IPv4. For IPv6, the TWAN assigns a distinct IPv6 gateway address (source address in Router Advertisement) and transient multicast address for router solicitation if needed.

10. The UE 510 sends a Layer 3 attach request.

For IPv4, the UE 510 sends a DHCP Request with server-identity option set to the distinct gateway IP address obtained in process element 4.

For IPv6, the UE 510 may optionally send a Router Solicitation with destination address set to the transient multicast address obtained in process element 4.

11. The TWAN responds to the layer 3 attach.

For IPv4, the TWAG sends a DHCP Acknowledgement with server-identity, router option set to the distinct gateway IP address for the APN/NSWO.

For IPv6, the TWAG sends a Router Advertisement when a Create Session Response (step 8) is received for this PDN connection or it receives Router Solicitation in process element 10. The Router Advertisement is sent with source address set to the distinct gateway IP address configured for this APN/NSWO in process element 4.

The UE 510 may determine the L2 address of the router interface by sending an ARP Request (IPv4) or Neighbour Solicitation (IPv6).

For subsequent PDN/NSWO connections set up following the initial attachment, process elements 3-11 are repeated. Establishing a second or further subsequent connection (IP address/interface) corresponding to an already signaled or established APN/NSWO session is straightforward using this method. In process element 3 above, the explicit parameters that are conveyed between UE 510 and TWAG 514 can include the means to indicate if a second connection is being requested. This ends the connection procedure description.

FIG. 6 schematically illustrates a UE Initiated Disconnection Procedure for PDN and/or NSWO connections established via the S2a interface. Elements of the wireless communication network shown in FIG. 6 are: a UE 610; an Access point (AP) 612; a Trusted Wireless access network (TWAN) 614; a 3GPP PDN gateway 616; a Visited Policy and Charging Rules Function (v-PCRF) 618; an AAA proxy 620; a home PCRF (h-PCRF) 622; and an HSS/AAA 624.

The procedure to disconnect already established PDN or NSWO for a trusted WLAN access is represented in FIG. 6 and is described below using numbered process elements matching the message communication numbers in FIG. 6:

1. The UE 610 sends a delete connection notification with the IP address and gateway IP address for the connection to trigger disconnection.

2. If the IP address to be released is not an NSWO connection, the TWAG/TWAN 614 initiates a Delete Session Request with the IP address of the 3GPP PDN connection. (see process element 2*a*).

For an NSWO connection on the other hand, the TWAN 614 releases local connection resources (see process element 2*b*).

Process elements 2-5 are as defined in 3GPP TS 23.402 "Architecture enhancements for non-3GPP accesses" (available from http://www.3gpp.org/DynaReport/23402.htm), sub-clause 16.3.1.1, steps 3 and 4.

6. The PDN gateway 616 acknowledges with a Delete Session Response (cause).

7. The UE 610 acknowledges with a Delete Connection Complete message.

8. Connection resources in the TWAG (not shown) and UE 610 are released.

This ends the disconnection procedure description.

FIG. 7 schematically illustrates a handover procedure from a 3GPP PDN gateway to a non-3GPP gateway. Elements of the wireless communication network shown in FIG. 6 are: a UE 710; an Access point (AP) 712; a Trusted Wireless access gateway (TWAN) 714; a serving gateway (S-GW) 716; a 3GPP PDN gateway 718; a Visited Policy and Charging Rules Function (v-PCRF) 720; an AAA proxy 722; a home PCRF (h-PCRF) 724; and an HSS/AAA 726.

The FIG. 7 handover procedure is based on the Connection Establishment Procedure in 3GPP TS 8.2.x.2.2 with the following additions, with process elements corresponding to the message numbers shown in FIG. 7:

At process element 0: the UE 710 is connected in the 3GPP Access (via an eNodeB) and has a Proxy Mobile IP version 6 (PMIPv6) or GTP tunnel on the S5/S8 interface. As shown in FIG. 1, the S5/S8 interface connects the serving gateway 116, 716 to the PDN gateway 118, 718.

At process element 1: the initial TWAN specific L2 procedures are performed. These procedures are TWAN specific and outside the scope of 3GPP.

At process element 2: if the handover establishes the first PDN connection in WLAN of the UE 710, an EAP procedure is performed in this step.

At process element 3: the UE 710 sets up an IP interface to perform initial PDN signaling with the TWAN/TWAG 714. During this sequence, if the UE 710 and TWAG 714 are Phase 2 compliant (i.e. supporting EPC-routed connections, handover and multiple PDN connections), the UE 710 sends a request to the TWAG 714 with the APN and a handover indication, to setup a PDN connection, i.e., to perform a seamless wireless offload. It will be appreciated that although the handover request in FIG. 7 illustrates an EPC routed handover request from cellular to Wi-Fi, a handover could alternatively be performed from eNodeB to TWAG and then to NSWO rather than EPC PDN gateway.

4. The TWAN/TWAG 714 sends a Create Session Request (APN, handover indication) message to the PDN GW 718. The APN and handover indication is set in the Create Session Request to allow the PDN GW 718 to re-allocate the same IP address or prefix that was assigned to the UE 710 while it was connected to the 3GPP IP access via an eNodeB 240 rather than using WLAN access via the TWAG 250 (see FIG. 2) and to initiate a Policy and Charging Enforcement Function (PCEF)-Initiated IP Connectivity Access Network (IP CAN) Session Modification Procedure with the PCRF 720, 724. The APN is used by the PDN GW 718 to determine which PDN connection(s) to handover, in the case that the UE 710 has established multiple PDN connections to different APNs.

9. The TWAN/TWAG 714 assigns a distinct IPv4 gateway address corresponding to the APN and responds with this address in server-identity and router address for IPv4. For IPv6, the TWAN/TWAG 714 assigns a distinct IPv6 gateway address (source address in Router Advertisement) and transient multicast address for router solicitation if needed.

Process elements 6 to 11 of the handover procedure of FIG. 7 are performed as for the Connection Establishment Procedure of FIG. 5 as described above.

12. The PDN GW 718 may initiate the PDN GW Initiated PDN Disconnection procedure in 3GPP access as defined in 3GPP TS 23.402 version 11.1.0 clause 5.6.2.2 or the PDN GW Initiated Bearer Deactivation procedure as defined in 3GPP TS 23.401, clause 5.4.4.1.

This ends the description of the handover procedure.

Figure 8:
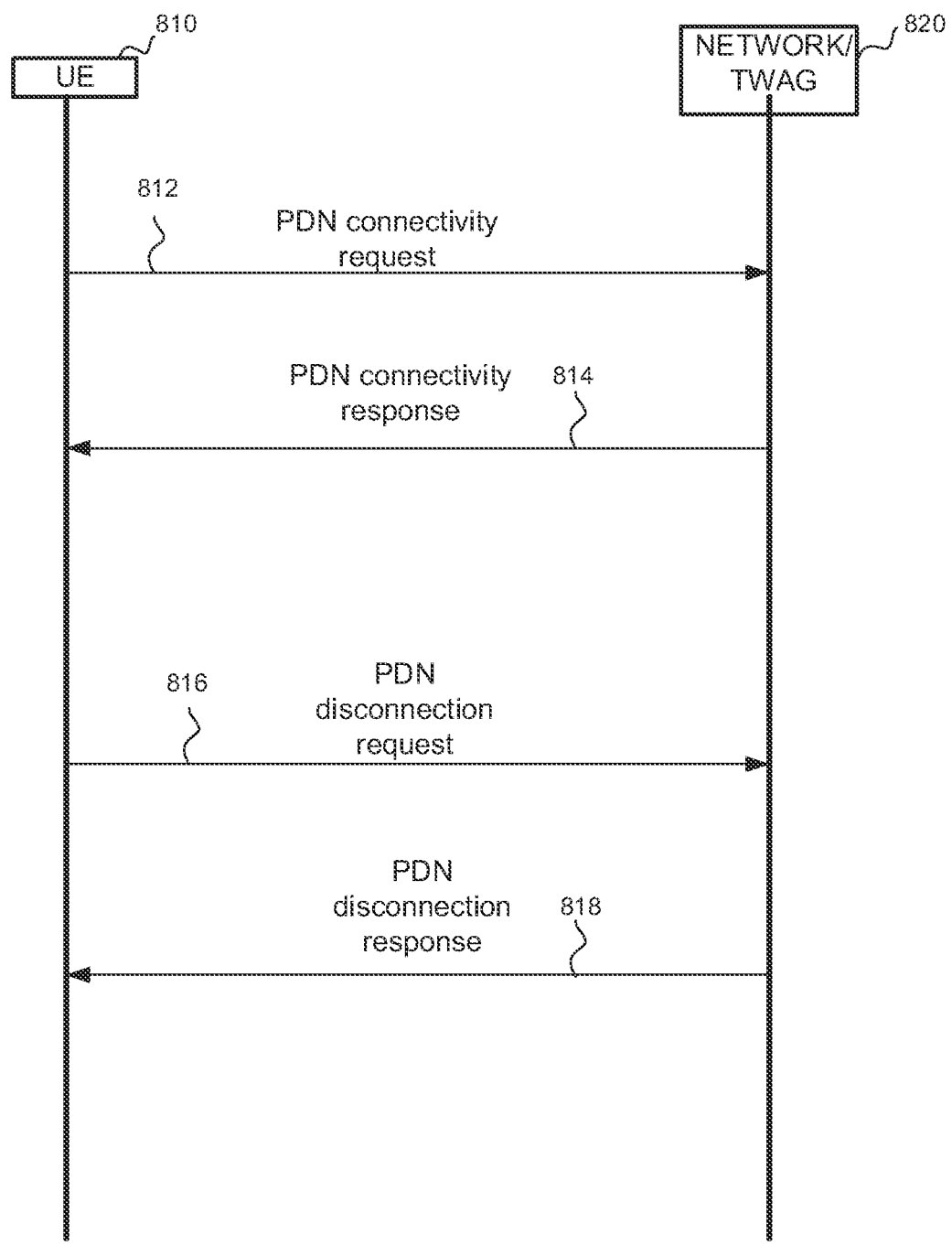
FIG. 8 schematically illustrates a WLAN control protocol message sequence.

FIG. 8 schematically illustrates WLAN Control Protocol (WLCP) or distinguishable-connection establishment request and response messages. The protocol according to the present technique may alternatively be referred to as a PDN control protocol. As shown in FIG. 8 a PDN connectivity request message 812 is sent from a UE 810 to a trusted non-3G Network/TWAG 820 and the UE 810 receives a PDN connectivity response 814 from the TWAG 820. When the UE 810 has performed the required data communication utilizing the non-3GPP network 820, the UE sends a PDN disconnection request 816 to the network/TWAG 820 and receives a PDN disconnection response 818 from the network/TWAG 820.

WLCP (or distinguishable-connection control protocol) is a UE-TWAG protocol to control (i.e. setup and teardown) the per-PDN point-to-point link. The transport for WLCP may be implemented as, for example: (i) a new ethertype (as specified by a particular field in an Ethernet frame); or (ii) using User Datagram Protocol (UDP).

The WLCP of FIG. 8 applies to the support of multiple PDN connections and enables a UE behavior similar to behavior over a cellular link, although a non-3GPP Wi-Fi link is being used for communication between the UE 810 and the TWAG 820. WLCP may reuse parts of 3GPP TS 24.008 Session Management messages for establishing/releasing PDN Connections as baseline. Successful EAP authentication and AP association may be required to use WLCP. WLCP is transparent to the intermediate nodes (e.g. Access Point/Access Controller) between the UE and TWAG. WLCP provides session management functionality required for PDN connections including the following functions:

Establishment of PDN connections
Handover of PDN connections
Requesting the release of a PDN connections by the UE or notifying the UE of the release of a PDN connection
IP address assignment (i.e. delivery of the IPv4 address through WLCP)

Both IPv4 address assignment (DHCPv4) and IPv6 address assignment (Stateless Address Auto-configuration) may be supported in conjunction with WLCP.

The PDN parameters used for the WLCP protocol include: APN, PDN/PDP type, UE IP address/prefix, Protocol Configuration Options (PCO), Request type (e.g. initial request or handover) and the TWAG MAC address associated to the PDN connection.

A User Plane Connection ID value is needed to differentiate PDN connections. For example, the virtual TWAG Address may be used is the user-plane connection ID. When establishing a new per-UE-and-PDN point-to-point link using WLCP, the network (TWAN) decides the User Plane Connection ID value and returns it to the UE using WLCP. The connection ID value may be returned to the UE as part of the PDN connectivity response message 814 of FIG. 8.

When the TWAN 820 provides access to the EPC in a multi-connection mode (i.e. multiple PDN and/or NSWO connections), it forwards user plane packets between the UE-TWAG point-to-point link corresponding to a specific PDN connection (see FIG. 2) and the associated S2a tunnel for that UE, which connects the TWAG to the corresponding 3GPP PDN gateway. To identify the point-to-point link between the UE 810 and its serving TWAG 820, which corresponds to an S2a tunnel for the associated PDN connection, the following two parameters may be used: (i) a MAC address of the UE 810; and (ii) a MAC address of the TWAG that is assigned for a specific PDN connection.

Now consider a user plane protocol for S2a mobility based on WLAN access to the EPC. Due to the possibility of several PDN gateways being able to freely to allocate the same private IP(v4) address to an UE (or to a PDN gateway to allocate the same private IP(v4) address to an UE as used by this UE for NSWO), an user plane connection identifier is introduced at the user plane interface between the UE and the TWAG to identify a (TWAN) connectivity service i.e. one of a PDN connection (3GPP) or a NSWO access (non-3GPP).

The following may be used, for example, as user plane identifiers based on a per
distinct VLAN ID
distinct layer 2 TWAG MAC addresses There is no need to manage radio bearers over the WLAN access, so the user plane connection identifier at the user plane interface between the UE 810 and the TWAG 820 may be used to map to a whole PDN connection.

A plurality of different GTP-u bearers may be used on S2a for a given PDN connection. GTP-u is part of the GPRS tunneling protocol used to carry user data within the GPRS core network and between the radio access network and core network. The user data transported may be in IPv4, IPv6 or PPP (Point-to-Point Protocol) formats. The same mechanism as for SAMOG 3GPP Release 11 is used to determine the GTP-u bearer to be used to carry a given packet, i.e., by using an Uplink-Traffic Flow template (UL-TFT) at the TWAG and using a Downlink—Traffic Flow Template (DL-TFT) at the PDN gateway. The UL-TFT is established by the PCRF (see FIG. 1) and sent to the UE in context setup messages. DL filtering is done in the PDN gateway and the DL-TFT is also established in the PCRF Note that FIGS. 9 and 10 depict the point to point link model between the UE and the TWAG for establishing multiple PDN connections.

Figure 9:
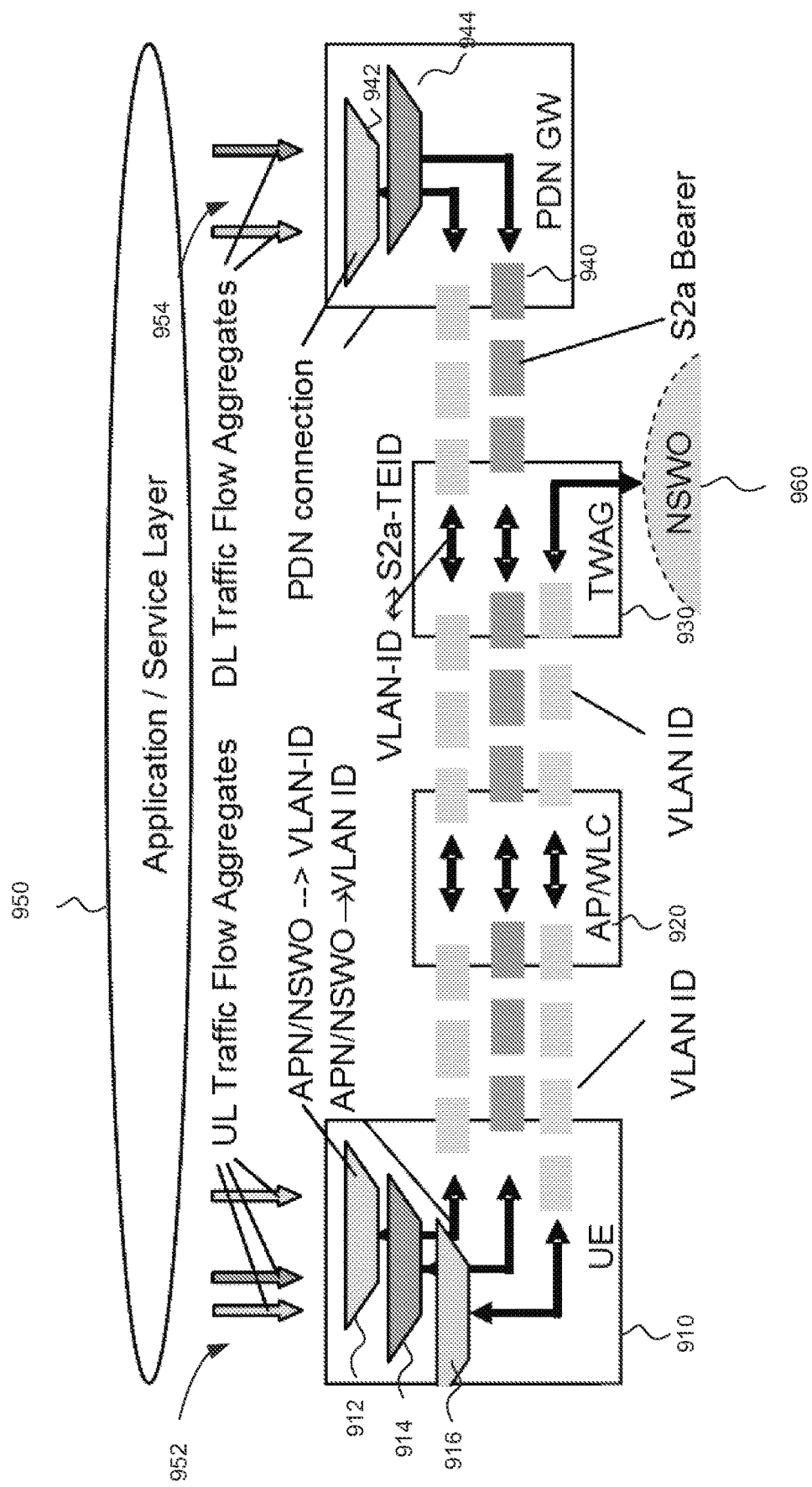
FIG. 9 schematically illustrates a first user-plane point-to-point link model using a VLAN ID identifier.
Figure 10:
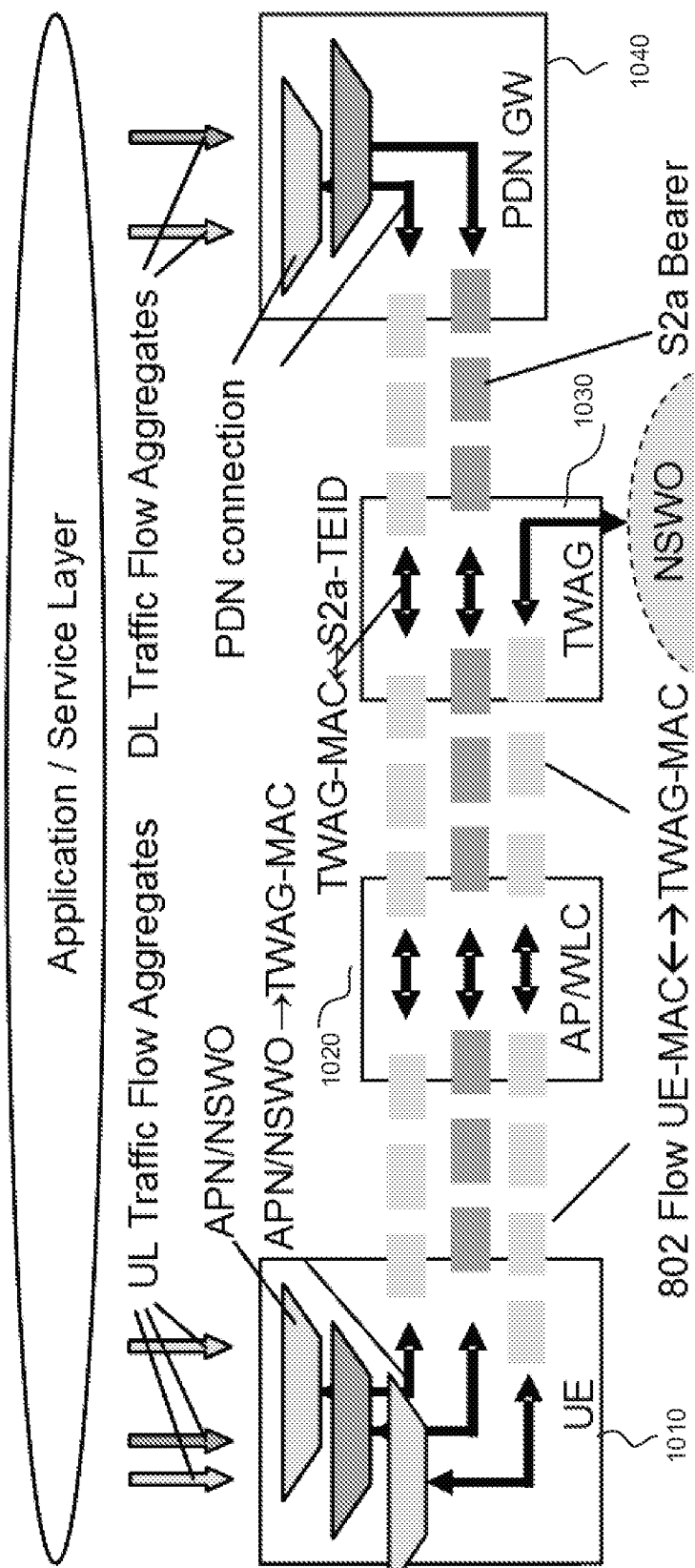
FIG. 10 schematically illustrates a second user-plane point-to-point link model using a TWAG MAC address identifier.

FIG. 9 schematically illustrates a user plane point-to-point link model in which a VLAN ID has been selected for use as a unique user plane connection identifier. However, any unique virtual gateway interface address/identifier may be used. The unique identifier is unique across all UEs connected to a given TWAG and uniquely distinguishes between a plurality of substantially simultaneous connections on a given TWAG (unique per UE and per connection). The user plane connection identifier used in the user plane may be the same or at least have the same origin or make use of the control plane connection identifier. FIG. 9 shows a UE 910, an Access Point/Wireless LAN Controller (AP/WLC) 920, a TWAG 930 and a PDN gateway 940. The TWAG 930 can form 3GPP packet data communications on an S2a interface with the PDN gateway and/or it can form non-3GPP packet data communication links via an NSWO entity 960. An application/service layer 950 communicates with the UE 910 and the PDN gateway 940 via uplink traffic flow aggregates 952 and downlink traffic flow aggregates 954. The uplink involves data flowing from the UE 910 to the PDN gateway 940 whereas the downlink involves data flowing from the PDN gateway 940 to the UE 910. The UE 910 has a set of three multiplexers 912, 914, 916 corresponding to three distinct packet data communication channels.

The PDN gateway 940 has two multiplexers 942, 944 corresponding to two 3GPP PDN connections over WLAN each being communicated using an S2a bearer per PDN connection from the TWAG. Multiplexers 912, 942 form a pair associated with a first PDN channel and the two multiplexers 914, 944 form a pair associated with a second PDN channel. The third multiplexer 916 of the UE is associated with an NSWO communication channel offloading data from the 3GPP network to a non-3GPP entity via the NSWO 950. Communication between the UE 910 and the TWAG 930 via the AP/WLC 920 uses Wi-Fi whereas communication between the TWAG 930 and the PDN gateway 940 uses 3GPP S2a bearers. Each of the three packet data communication channels (corresponding to 912, 914, 916) at the UE has a distinct associated Virtual Local Area network ID (VLAN ID). Communications 942, 944 using the S2a bearer between the TWAG 930 and the PDN gateway 940 each have an associated Tunnel Endpoint Identifier (TEID) associated with the GTP tunnel in addition to a VLAN ID.

As depicted in the FIG. 9, a virtual point-to-point link corresponding to a given connectivity service is realized as follows: enforcing forwarding of uplink and downlink IP packets between distinct PDN connections and NSWO access into their corresponding VLANs. This is done by marking layer 2 frames conveying these IP packets with the appropriate VLAN ID (i.e. using a VLAN tag). Each packet data connection has a distinct VLAN ID.

The VLAN marking is performed over the IEEE standard 802.11 air-link as specified by IEEE 802.11 appendix M. This VLAN marking information may be carried un-modified to the TWAG 930.

The VLAN tag used on the interface between the UE 910 and the TWAG 930 to identify a given connectivity service (a PDN connection or a NSWO service) is negotiated between the UE 910 and the TWAG 930 at the set-up of the PDN connection. Hence multiple PDN connections to the same APN are supported (as they correspond to different VLAN tags).

FIG. 10 schematically illustrates an alternative way of implementing a unique user plane connection identifier to the mechanism of FIG. 9. In particular, FIG. 10 schematically illustrates using a distinct layer 2 TWAG MAC address to identify a user plane connection in a point to point link model for PDN connection and NSWO 960 access. Similarly to FIG. 9, the FIG. 10 arrangement comprises: a UE 1010, an Access Point/Wireless LAN Controller (AP/WLC) 1020, a TWAG 1030 and a PDN gateway 1040.

In the link model illustrated by FIG. 10, the virtual point-to-point link required to transport traffic for a given PDN connection, or for a Non-Seamless WLAN Offload (NSWO) access is realized by the TWAG 1030 reserving a distinct MAC address that uniquely (on a per-UE basis) corresponds to an APN (3GPP) or a NSWO (non-3GPP) access. These distinct layer 2 MAC addresses are configured on the TWAG interface, i.e., the TWAG can receive and send layer 2 frames from each of these three MAC addresses. However, the UE 1010 only requires a single MAC address as an identifier on its side. As depicted in FIG. 10, a virtual point-to-point link is realized via enforcing a forced forwarding of uplink IP packets to the corresponding layer 2 TWAG MAC address located in the layer 2 header of the frame containing the IP packets and the forwarding of downlink IP packets from the corresponding layer to TWAG MAC address of the frame.

Otherwise the solution works as described in relation to FIG. 9 above, but for following points:

The TWAG MAC address that is used on the interface between the UE 1010 and the TWAG 1030 to identify a given connectivity service (a PDN connection or a NSWO service) is negotiated between the UE 1010 and the TWAG 1030 at the set-up of the PDN connection.

When a TWAG MAC address identifies an APN, then multiple PDN connections to the same APN are not supported in this example arrangement. However, when each TWAG 1030 connectivity service is identified by a distinct MAC address then multiple PDN connections to the same APN may be supported. The latter approach may mean a lot of MAC address to manage at the TWAG 1030. For uplink broadcasts signaling (e.g. IPv6 RS, IPv6 ND, ARP, and service discovery requests (e.g. Digital Living Network Alliance) generally sent using an L2 (MAC) broadcast address:

When the destination MAC address used over WLAN is a broadcast address and not the TWAG MAC address associated with a TWAN connectivity service, a specific handling would be required at the TWAN to handle such traffic or;

The UE uses unicast MAC addressing for such traffic as described in RFC 6085 "Address Mapping of IPv6 Multicast Packets on Ethernet" for the IPv6 case.

Figure 11:
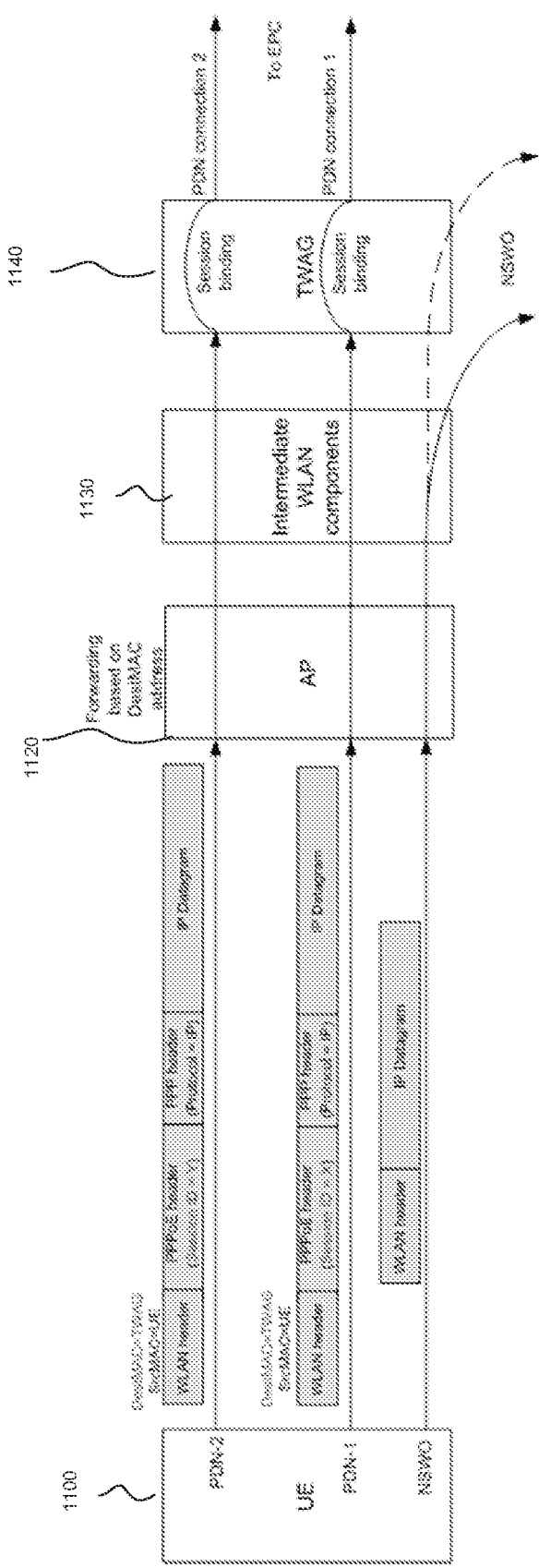
FIG. 11 schematically illustrates PDN connections using a Point-to-Point Protocol.

FIG. 11 schematically illustrates creation of a PDN connection over TWLAN by establishing a Point-to-Point Protocol/Point-to-Point Protocol over Ethernet (PPP/PPPoE). The protocols PPP and PPPoE are defined by the Internet Engineering Task Force (IETF) and are available from http://tools.ietf.org/html/rfc1661 (RFC 1661 for PPP) and http://tools.ietf.org/html/rfc2516 (RFC 2516 for PPPoE). The FIG. 11 arrangement comprises a UE 1100, an AP 1120, a set of intermediate WLAN components 1130 and a TWAG 1140. The UE 1100 has established two different 3GPP PDN connections with the TWAG 1140, which link to the 3GPP EPC (not shown) and also has an NSWO packet data connection, which routes traffic to a non-3GPP processing entity (not shown).

In the FIG. 11 system a PDN Connection over a TWAN is created by establishing a PPPoE/PPP session between the UE 1100 and TWAG 1140. The PPPoE protocol is used to create a virtual point-to-point link between the UE 1100 and TWAG 1140.

The UE 1100 encapsulates all traffic pertaining to a PDN connection into PPPoE frames comprising a WLAN header, a PPoE header, a PPP header (specifying IP protocol) and an IP datagram. These frames include a PPPoE session ID, which differentiates traffic between different PDN connections. As shown in FIG. 11, a first PDN connection of the UE 1100 has PPoE header set to "session ID=Y" whereas a second PDN connection of the UE 1100 has the PPoE header "Session ID=X".

The TWAG 1140 binds a PPPoE session ID with an EPC Bearer identity corresponding to a PDN connection. Traffic arriving from a certain PPPoE session ID is forwarded to the linked PDN connection and vice versa.

A Non-Seamless WLAN Offload (NSWO) connection does not use PPP or PPPoE. So, NSWO traffic is transmitted directly over WLAN without any PPPoE encapsulation. FIG. 11 shows that for the NSWO connection established by the UE 1100, the IP datagram has only an associated WLAN header and no PPPoE header or PPP header. The FIG. 11 scheme is another alternative to the PDN transport mechanisms A, B and C described earlier in this specification.

Figure 12:
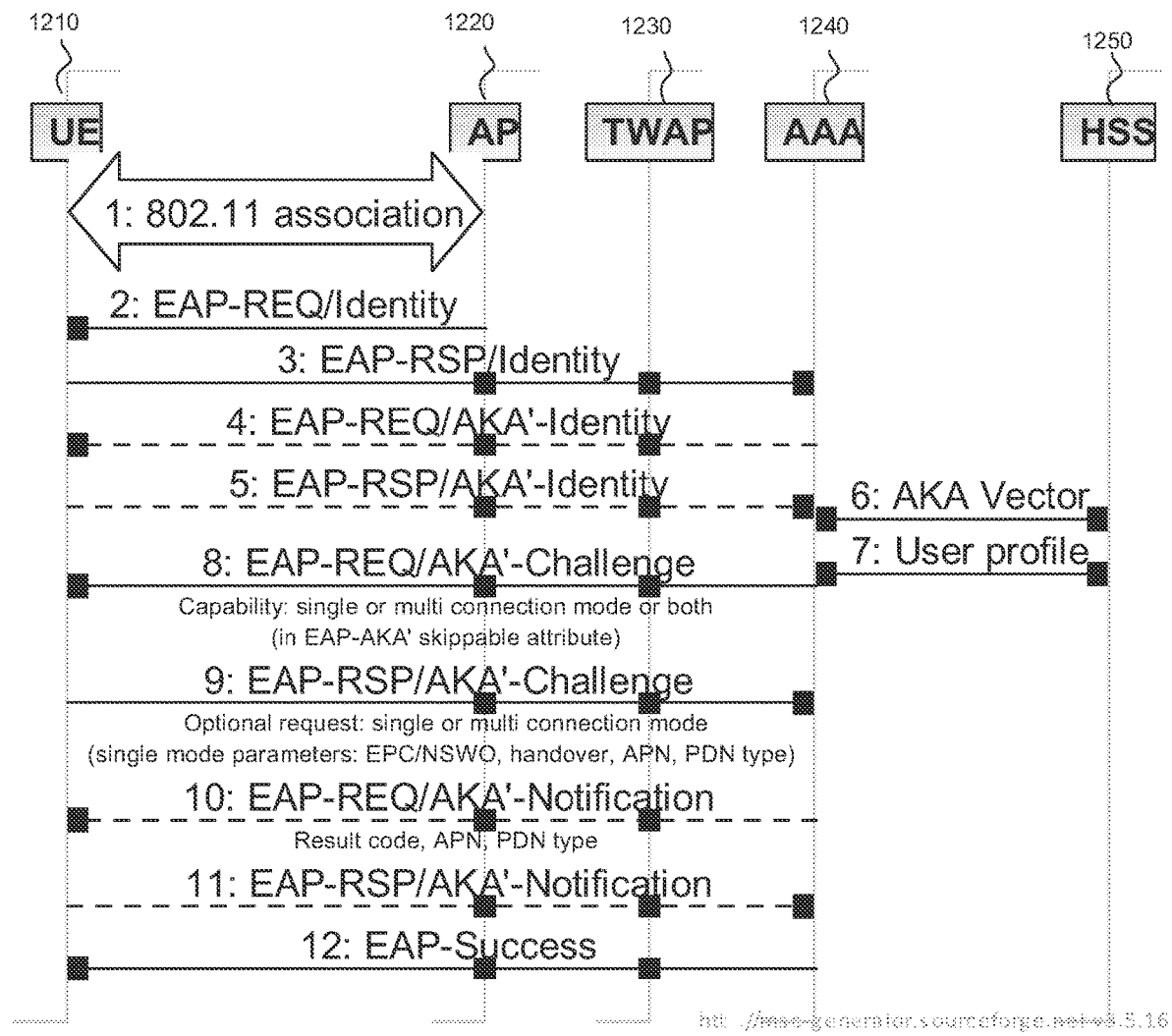
FIG. 12 schematically illustrates a compatibility exchange between a UE and a TWAN.

FIG. 12 schematically illustrates a compatibility exchange between a UE and a TWAN performed during an EAP-AKA' authentication process to negotiate an appropriate mode of operation with regard to SaMOG. Selection of a mode of operation from the perspective of whether single or multiple PDN and/or NSWO are possible between a UE and a TWAN takes place according to the present technique by modification of the established EAP-AKA' authentication protocol as defined by IETF RFC 5448. As shown in FIG. 12, the authentication involves a message passing exchange between a UE 1210 and other network elements comprising an AP 1220, a Trusted WLAN Access Point (TWAP) 1230, an AAA server 1240 and an HSS 1250. To implement the SaMOG according to the present technique, no new messages need to be added to the EAP-AKA' protocol, but new information elements are added. Process elements 1 to 7 of FIG. 12 may be performed according to the EAP-AKA' protocol. However, process elements 8, 9 and 10 are performing taking into account the new information elements according to the present technique.

In process element 8, the TWAP 1230 sends its capability (single connection mode, multi-connection mode or both) in an attribute that can be skipped.

In process element 9, the UE selects the specific connection mode and sends relevant parameters along with it. Those parameters may include single connection mode or multi connection mode and single connection mode parameters may include: whether a requested connection is a 3GPP PDN connection or an NSWO connection; whether the connection is a handover connection between EPC and NSWO; an associated APN; and a PDN type.

In process element 10, the TWAP 1230 indicates a selected connection mode along with other relevant parameters (e.g. result code, APN, PDN type) as part of an STa interface (situated between a PDN gateway and an AAA server).

Note that a pre Release 12 LTE TWAP 1230 will not send capabilities in process element 8 (i.e. will not be able to support phase 2 SaMOG), so the UE 1210 can discover if the TWAP 1230 is a pre Release 12 LTE network or not.

A pre Release-12 LTE UE may be configured to discard the TWAN capability in process element 8 of FIG. 12 and will not send a connection request to the AAA 1240 in process element 9. In this way it is discoverable to the TWAN if the UE 1201 is a pre Release-12 LTE UE or not.

Figure 13:
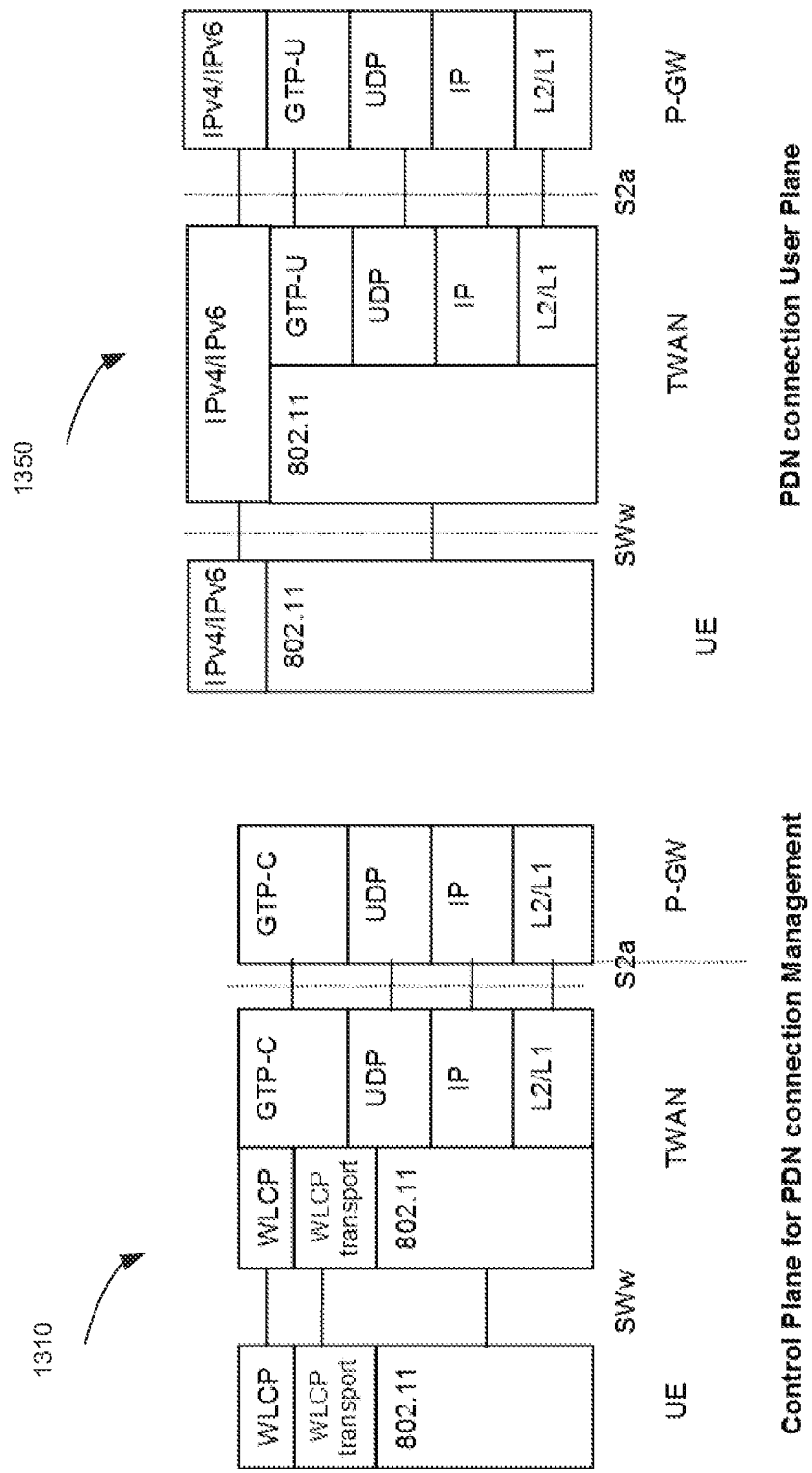
FIG. 13 schematically illustrates control plane and user plane protocol stacks for PDN connections.

FIG. 13 schematically illustrates protocol stacks for both control plane PDN connection management and for user plane PDN connection.

A control plane protocol stack 1310 has many similarities to a user plane protocol stack 1350. Differences between the two protocol stacks are that the control plane has a newly defined distinguishable-connection control protocol and associated transport layer in both the UE and the TWAN, which is not required in the user plane protocol stack. The TWAN and the PDN gateway of the control plane protocol stack use GTP-C whereas the TWAN and the PDN gateway of the user plane protocol stack use GTP-U. The uppermost layer of the user plane protocol stack uses IPv4 or IPv6 for data transport and these are not required in the control plane.

The UE and TWAN on both the control planes and the user planes communicate across an SWw interface using the IEEE 802.11 standard, which is a set of media access control (MAC) and physical layer (PHY) specifications for implementing WLAN computer communication in the 2.4, 3.6, 5 and 60 GHz frequency band. According to the present technique, FIG. 13 refers to Layer 1 and Layer 2 defined by IEEE 802.11-2007 [64]. According to the present technique, a TWAG MAC address is used as a multiplexing identifier between multiple PDN connections belonging to the same UE.

With regard to the WLCP Transport layer, which sits on top of IEEE 802.11 for the UE and for the TWLAN as shown in the control plane protocol stack 1310, the WLCP is used to establish and release PDN connections.

In the control plane protocol stack 1310, GTP-C is implemented between the TWAN and the PDN gateway across the 3GPP S2a interface and GTP-C is defined in IEEE TS 29.274.

In the user plane protocol stack 1350 GTP-U is used to create data tunnels between the TWAN and the PDN gateway across the S2a interface and GTP-U is defined in IEEE TS 29.281.

UDP is the transport layer protocol onto which both GTP-C and GTP-U are layered.

In the user plane 1350, IPv4 and IPv6 are network layer protocols in the uppermost layer of the illustrated protocol stack. On the TWLAN the functionality of these protocols includes forwarding of user plane IP packets between the UE-TWAN point-to-point link and the relevant S2a tunnel.

Figure 14:
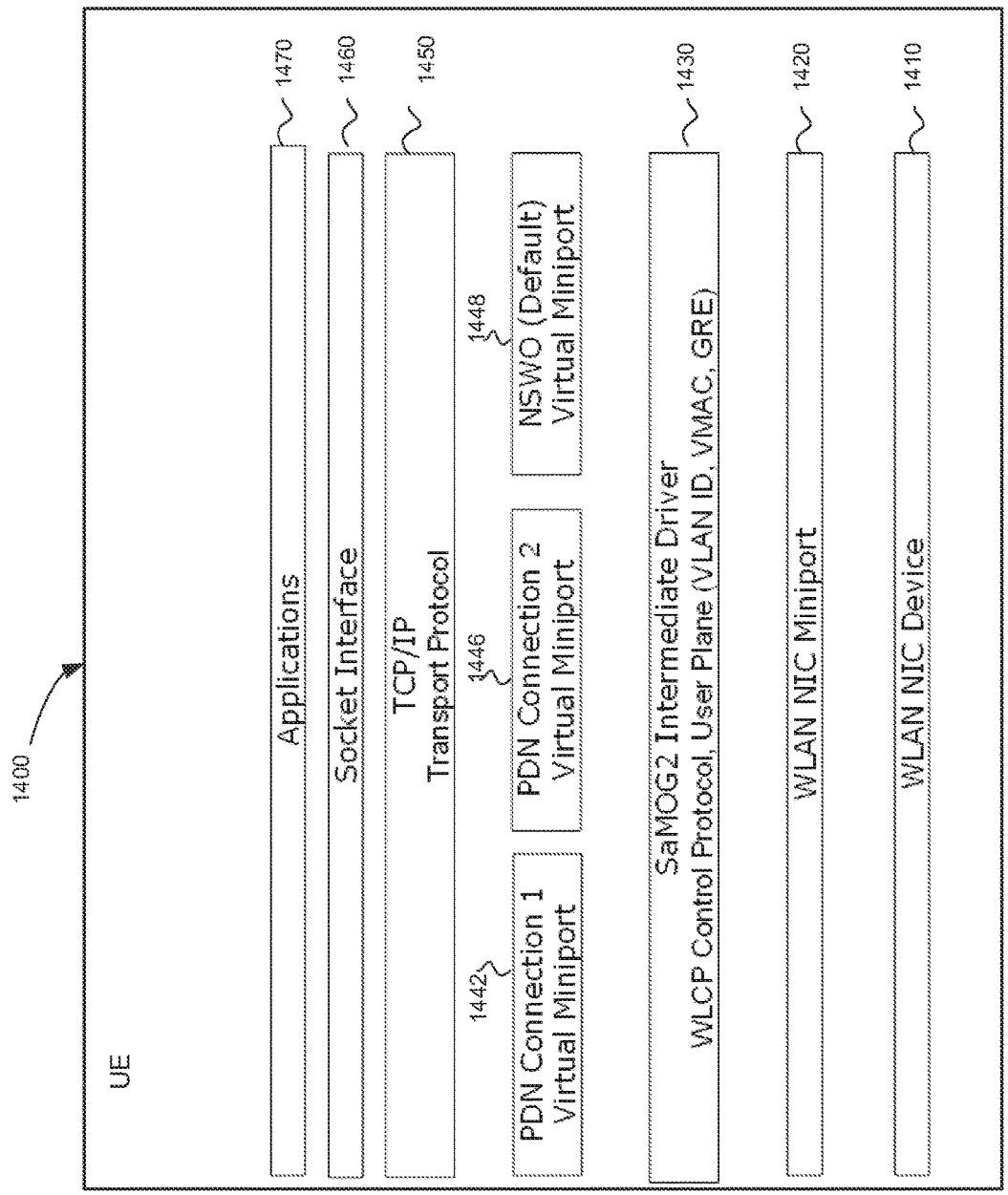
FIG. 14 schematically illustrates a UE network protocol stack for Phase 2 SaMOG.

FIG. 14 schematically illustrates a UE network protocol stack for SaMOG providing multiple PDN connections. From bottom to top, the UE network protocol stack comprises: a WLAN network interface card device 1410; a WLAN network interface card miniport 1420; a SaMOG phase 2 intermediate driver 1430; a virtual miniport layer 1440 having: a first PDN connection virtual miniport 1442, a second PDN connection virtual miniport 1446 and a NSWO virtual miniport; a TCP/IP transport protocol layer 1450; a socket interface layer 1460; and an applications layer 1470.

A miniport driver is for a physical network interface card and corresponds to a particular PDN connection. This may be implemented in software on the PDU.

The SaMOG2 intermediate driver 1430 is configurable to deal with multiple Quality of Service (QoS) based queues and to appropriately multiplex them to WLAN driver queues managed by the WLAN NIC miniport 1420 and/or WLAN NIC device 1410 based on configurable quota allocation per virtual miniport 1442, 1446, 1448. The driver 1430 is also configured to be able to deal with re-queuing and re-ordering in the case of PDN connection establishment and termination. The SaMOG2 intermediate driver 1430 may be implemented in software, in firmware, on a Field Programmable Gate Array or on-chip. The virtual miniports 1442, 1446, 1448 provide virtualized access to the hardware resources of the WLAN NIC device and the SaMOG2 intermediate driver is analogous to a hypervisor in a virtualized system, mediating access to the WLAN NIC miniport 1420 and to the WLAN NIC device.

The MAC Service data Unit (MSDU) aggregation needs to deal with the ability to avoid aggregation of frames from different virtual miniports 1442, 1446, 1448.

The virtual miniports 1442, 1446, 1448 may be of type "Network Interface" or alternatively may be of the type "Wireless Interface". In a further alternative configuration, all of the virtual miniports and PDN connections may be implemented over a single raw socket with a protocol driver running on top of the socket to allow applications see their sockets as standard network interfaces.

Figure 15:
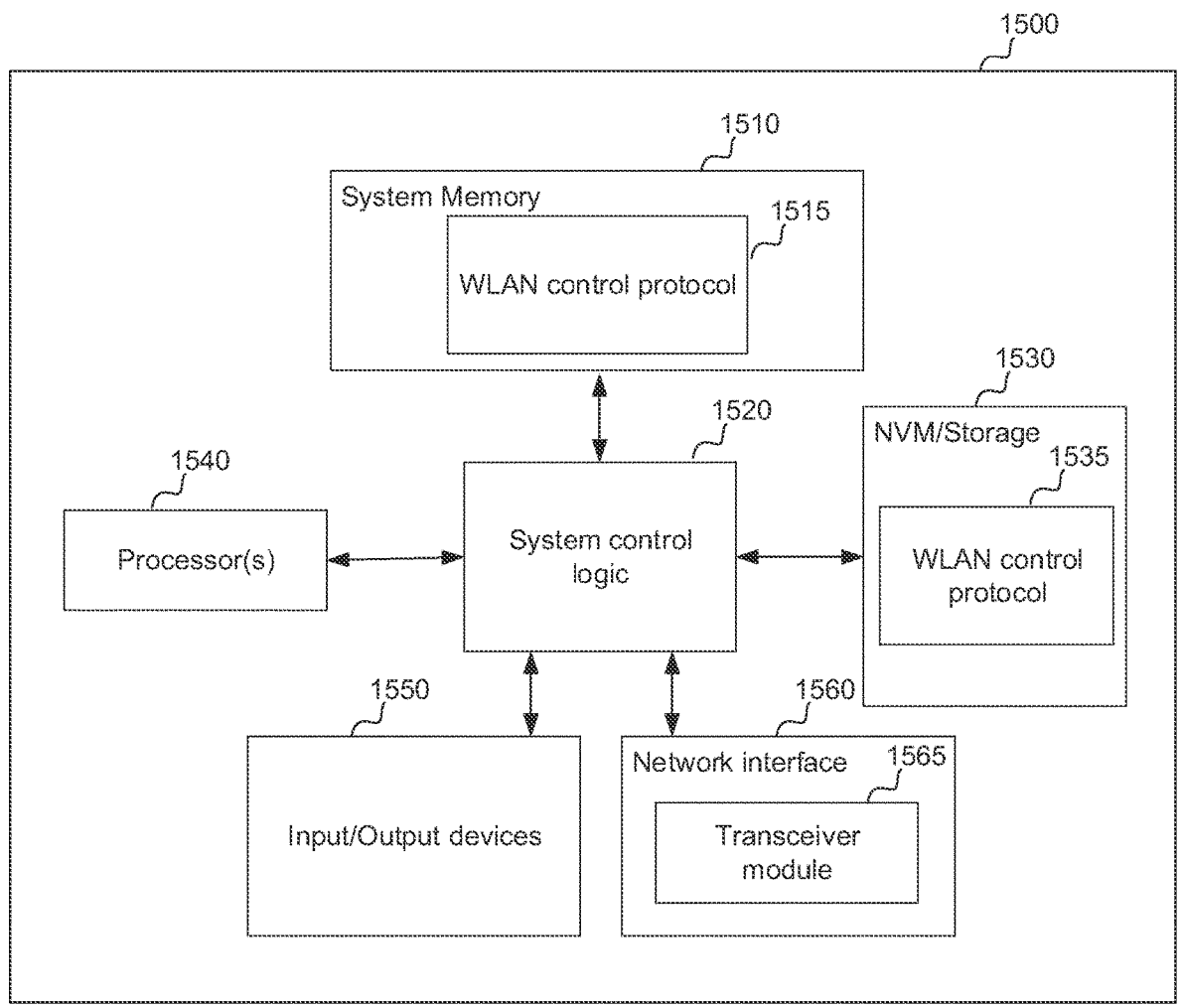
FIG. 15 schematically illustrates an example system.

FIG. 15 illustrates, for one embodiment, an example system 1500 comprising one or more processor(s) 1540, system memory 1510, system control logic 1520 coupled with at least one of the processor(s) 1510, system memory 1520, non-volatile memory (NVM)/storage 1530, a network interface 1560 and Input/Output devices 1550. The system 1500 is arranged to realize the processing described above and below.

Processor(s) 1540 may include one or more single-core or multi-core processors. Processor(s) 1540 may include any combination of general-purpose processors and/or dedicated processors (e.g., graphics processors, application processors, baseband processors, etc.). Processors 1540 may be operable to carry out the signal processing described herein using suitable instructions or programs (i.e. operate via use of processor or other logic, instructions) 1515. The instructions 1515 may be stored in system memory 1520, as system instructions, or additionally or alternatively may be stored in (NVM)/storage 1530, as NVM instructions 1535.

The system control logic 1520 for one embodiment may include any suitable interface controllers to provide for any suitable interface to at least one of the processor(s) 1540 and/or to any suitable device or component in communication with the system control logic 1520.

The system control logic 1520 for one embodiment may include one or more memory controller(s) to provide an interface to the system memory 1510. The system memory 1510 may be used to load and store data and/or instructions for system 1500. The system memory 1510 for one embodiment may include any suitable volatile memory, such as suitable dynamic random access memory (DRAM), for example.

The NVM/storage 1530 may include one or more tangible, non-transitory computer-readable media used to store data and/or instructions, for example. The NVM/storage 1530 may include any suitable non-volatile memory, such as flash memory, for example, and/or may include any suitable non-volatile storage device(s), such as one or more hard disk drive(s) (HDD(s)), one or more compact disk (CD) drive(s), and/or one or more digital versatile disk (DVD) drive(s), for example.

The NVM/storage 1530 may include a storage resource physically as a part of a device on which the system 1500 is installed or it may be accessible by, but not necessarily a part of, the device. For example, the NVM/storage 1530 may be accessed over a network via the network interface 1560.

The system memory 1510 and the NVM/storage 1530 may respectively include, in particular, temporal and persistent copies of, for example, the instructions 1515 and 1535, respectively. Instructions 1515 and 1535 may include instructions that when executed by at least one of the processor(s) 1540 result in the system 1500 implementing a one or more of flow diagrams, methods, signal sequences, examples or embodiments described herein, corresponding to the WLAN control protocol including the control plane protocol, user plane protocol and compatibility exchange. In some embodiments, instructions 1515 and 1535, or hardware, firmware, and/or software components thereof, may additionally/alternatively be located in the system control logic 1520, the network interface 1560, and/or the processor(s) 1540.

The network interface 1560 may have a transceiver module 1565 to provide a radio interface for the system 1500 to communicate over one or more network(s) (e.g. wireless communication network) and/or with any other suitable device. The transceiver module 1565 may be implement receiver module that performs the above processing of the received signals to realize interference mitigation. In various embodiments, the transceiver module 1565 may be integrated with other components of system 1500. For example, the transceiver module 1590 may include a processor of the processor(s) 1510, the memory of the system memory 1520, and the NVM/Storage of NVM/Storage 1540. The network interface 1560 may include any suitable hardware and/or firmware. Network interface 1560 may be operatively coupled to a plurality of antennas (not shown) to provide a multiple input, multiple output radio interface. The network interface 1560 for one embodiment may include, for example, a network adapter, a wireless network adapter, a telephone modem, and/or a wireless modem.

For one embodiment, at least one of the processor(s) 1540 may be packaged together with logic for one or more controller(s) of system control logic 1520. For one embodiment, at least one of the processor(s) 1540 may be packaged together with logic for one or more controllers of system control logic 1520 to form a System in Package (SiP). For one embodiment, at least one of the processor(s) 1540 may be integrated on the same die with logic for one or more controller(s) of system control logic 1520. For one embodiment, at least one of the processor(s) 1540 may be integrated on the same die with logic for one or more controller(s) of system control logic 1520 to form a System on Chip (SoC).

In various embodiments, the I/O devices 1550 may include user interfaces designed to enable user interaction with the system 1500, peripheral component interfaces designed to enable peripheral component interaction with the system 1500, and/or sensors designed to determine environmental conditions and/or location information related to the system 1500.

Figure 16:
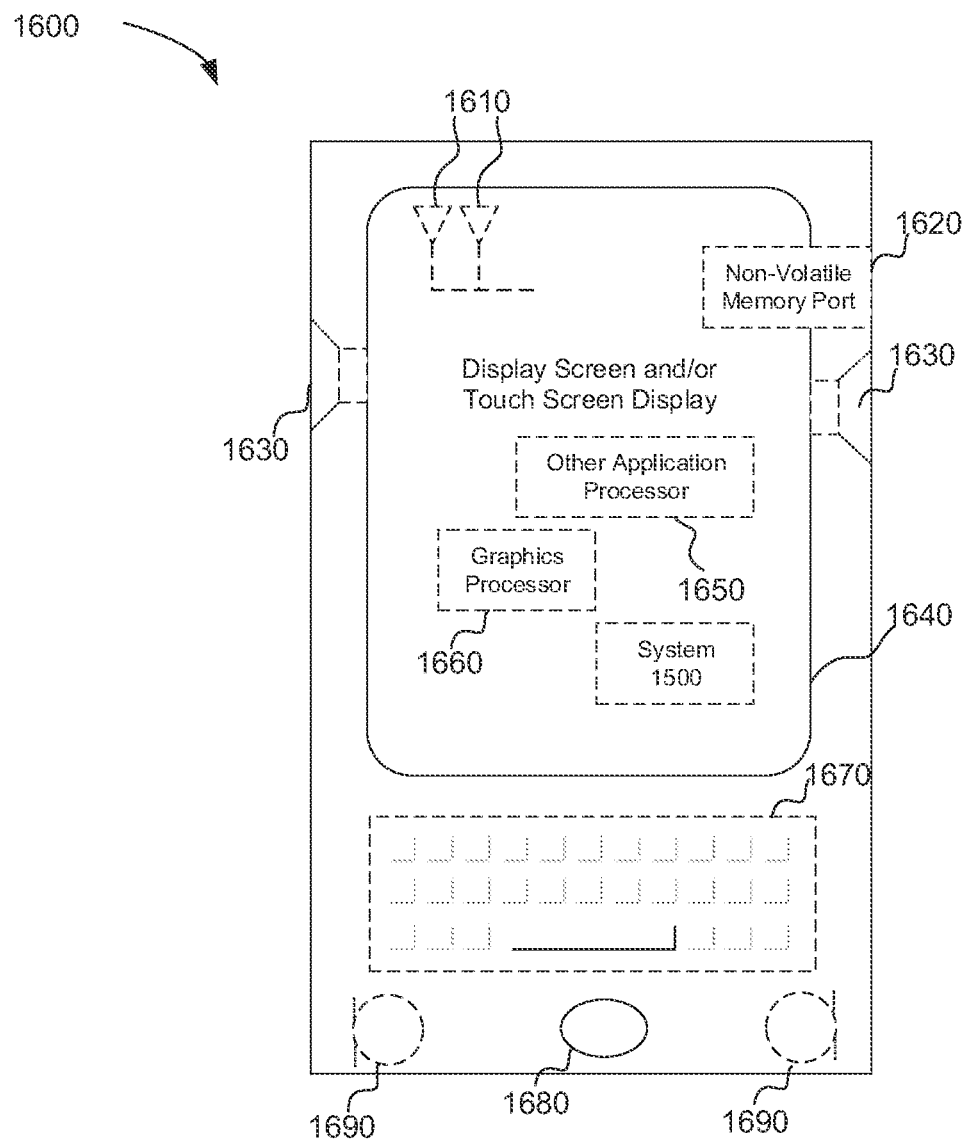
FIG. 16 schematically illustrates a mobile device comprising the system of FIG. 15.

FIG. 16 shows an embodiment in which the system 1500 is used to realize a UE in form of a mobile device 1600. Examples of a UE include a mobile terminal, a tablet computer, a personal digital assistant (PDA) and a machine-type communication (MTC) device.

In various embodiments, the user interfaces could include, but are not limited to, at least one or more of a display 1610 (e.g., a liquid crystal display, a touch screen display, etc.), a speaker 1630, a microphone 1680, one or more cameras 1690 (e.g., a still camera and/or a video camera), a flashlight (e.g., a light emitting diode flash), and a keyboard 1670, taken jointly and severally in any and all permutations.

In various embodiments, the peripheral component interfaces may include, but are not limited to, a non-volatile memory port, an audio jack, and a power supply interface.

In various embodiments, the sensors may include, but are not limited to, a gyro sensor, an accelerometer, a proximity sensor, an ambient light sensor, and a positioning unit. The positioning unit may also be part of, or interact with, the network interface 450 to communicate with components of a positioning network, e.g., a global positioning system (GPS) satellite.

In various embodiments, the system 1500 may be a mobile computing device such as, but not limited to, a laptop computing device, a tablet computing device, a netbook, a mobile phone, etc. In various embodiments, system 1500 may have more or fewer components, and/or different architectures. Additionally, the mobile device 1600 may comprise at least one or more of a memory port 1620 for receiving additional memory (not shown), a graphics processor 1660 and an application processor 1650, taken jointly and severally in any and all permutations. The mobile device can comprise one, or more than one, antenna 1610.

It should be understood that where the functional units described in this specification have been labeled as modules, to highlight their implementation independence. Note that a module may be implemented, for example, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Where functional units have been described as circuitry, the circuitry may be general purpose processor circuitry configured by program code to perform specified processing functions. The circuitry may also be configured by modification to the processing hardware. Configuration of the circuitry to perform a specified function may be entirely in hardware, entirely in software or using a combination of hardware modification and software execution. Program instructions may be used to configure logic gates of general purpose or special-purpose processor circuitry to perform a processing function. According to the present technique, it has been recognized that 3GPP Release-11 still has the following limitations:

No access to EPC simultaneously with access to a local IP network directly reachable behind the WLAN access (NSWO)

Single PDN connection over WLAN

No IP address preservation when the UE moves between 3GPP & WLAN

With regard to previously known systems, when using the cellular access to set up PDN connections via an eNodeB, Non-Access Stratum messages (Attach request, Create PDP Context etc.) that go to the MME (see FIG. 1) are used and then the MME sets up the PDN connection.

When using non-3GPP access such as TWLAN, the MME is not involved at all. Instead, as part of an authentication request, the APN and other relevant information is sent to ePDG (for untrusted access when using S2b) and to TWAG (for trusted access when using S2a) and then the connection is established with relevant PDN-GW using PMIP or GTP protocols. This is illustrated, for example, in FIG. 7.2.2-1 in TS 23.402 (clause 7.2.1).

The trusted WLAN does not use ePDG and uses S2a instead of S2b, but before Rel-12 the connection setup was quite similar for both trusted and untrusted access, except that in case of untrusted access an extra security tunnel was created with ePDG. So the PDN connection establishment procedure is similar. Effectively, in previously known systems, the TWAG could not distinguish between PDN/NSWO connections, but merely acted as a "blind" pass through for the information. By way of contrast, according to the present technique, a point-to-point link model is provided, which allows multiple simultaneous concurrent PDN and/or NSWO connections to different APNs over S2a. Here the TWAG is a true end-point of a connection where information regarding to the plurality of different PDN and/or NSWO connections can be processed. Connection and disconnection request and response messages including connection-describing attributes are used to implement the control protocol and a characteristic transport mechanism is defined.

According to the present technique, the following aspects of forming PDN communications in a network comprising 3GPP communication and non-3GPP communication are provided:

For a UE, multiple simultaneous PDN connections over Trusted WLAN are supported, including the support for establishment of concurrent PDN Connections via 3GPP access and over WLAN.

For a UE, PDN Connectivity to EPC over Trusted WLAN concurrent with non-seamless WLAN offload (NSWO) is supported.

The UE is capable of IP address preservation in case of mobility between a 3GPP access and a Trusted WLAN. The UE is capable of requesting IP address preservation per PDN connection in case of mobility between a 3GPP access and a Trusted WLAN.

The UE is capable of signaling the requested APN over Trusted WLAN, and the UE is capable of receiving the selected APN over Trusted WLAN (e.g. in case the UE did not indicate an APN).

The UE is capable of indicating whether it requests a PDN connection or a NSWO service over Trusted WLAN, and the UE is capable of receiving an indication of whether the granted service is a PDN connection or NSWO (e.g. in case the UE did not indicate the kind of service it was requesting).

The present technique provides a control plane solution based on L2 IEEE 802.11 Action frames and a new GAS (Generic Advertisement Protocol) for SaMOG appropriate for implementation in 3GPP Release 12. Also provided are a capability exchange between the UE and the TWAG to negotiate which S2a mobility features are supported and a user plane protocol enabling efficient and accurate correlation of user plane IP packets to individual 3GPP PDN connections or to non-3GPP NSWO connections.

EXAMPLES

The following examples pertain to further embodiments.

In this specification, the phrase "at least one of" should be interpreted to mean any one or more of the plurality of listed items, taken jointly and severally in any and all permutations.

Example 1 is connection control circuitry for a User Equipment (UE) for use in a cellular wireless communications network configurable to offload communication of packet data from a cellular radio-access network comprising an Evolved Packet Core (EPC) to a Trusted Wireless Local Access Network (TWLAN) comprising a Trusted Wireless Access Gateway (TWAG), the connection control circuitry comprising:
  a connection requesting module configured to send a distinguishable-connection establishment message to the TWAG, the message requesting setup of a TWAG-routed data connection comprising at least one of a Packet Data Network (PDN) connection directed through an EPC PDN gateway and a Non-Seamless Wireless Offload (NSWO) connection directed through a non-3GPP gateway;
  a connection setup module configured to receive from the TWAG, in response to the distinguishable-connection establishment message, a unique virtual gateway interface address and configured to establish a point-to-point link between the UE and the TWAG, the point-to-point link being distinguishable from any other substantially simultaneous point-to-point link between any UE and the TWAG using the corresponding unique virtual gateway interface address.

Example 2 may be the subject matter of Example 1, wherein the distinguishable-connection establishment message is a request message comprising at least one TWAG-routed data connection attribute selected from: a handover indication for handover between an NSWO connection and a PDN connection; an initial attach indication; a choice between NSWO connection and PDN connection; a UE-specified Access Point Name; a Packet Data Network type; a user plane connection identifier; a control plane connection identifier; a protocol configuration option; and an indication of whether Internet protocol address preservation is required for a handover connection.

Example 3 may be the subject matter of Example 1 or Example 2, wherein the response received by the connection setup module comprises, in addition to the unique virtual gateway interface address, an Access Point name selected by the TWLAN.

Example 4 may be the subject matter of any one or more of Example 2 and Example 3, comprising connection teardown circuitry configured to send from the UE to the TWAG a disconnection request comprising the unique virtual gateway interface allowing the TWAG to identify a TWAG-routed data connection to disconnect.

Example 5 may be the subject matter of Example 4, wherein the connection teardown circuitry is configured to receive, in response to the disconnection request, a disconnection response comprising an indication of a status of the connection for which disconnection has been requested.

Example 6 may be the subject matter of any one of more of Examples 1 to 5, wherein the unique virtual gateway interface address used by the connection setup module to identify the point-to-point link comprises one of a gateway Medium Access Control (MAC) address and a gateway Internet Protocol (IP) address.

Example 7 may be the subject matter of any one of more of Examples 1 to 6, wherein the connection setup module is configured to perform one of IPv4 address configuration and IPv6 address configuration using the unique virtual gateway interface address to form a Dynamic Host Configuration Protocol (DHCP) request in the case of an IPv4 address configuration and to optionally form a Router Solicitation in the case of an IPv6 configuration.

Example 8 may be the subject matter of any one of more of Examples 1 to 7, wherein the connection requesting module is configured to indicate to the TWAG in the distinguishable connection establishment message that the requested connection corresponds to a 3GPP-TWAG handover between a connection with a PDN gateway established via an eNodeB and one of: a TWAG-routed data connection comprising one of: a Packet Data Network (PDN) connection directed through an EPC PDN gateway; and a Non-Seamless Wireless Offload (NSWO) connection directed through a non-3GPP gateway Example 9 may be the subject matter of Example 8, wherein when the 3GPP-TWAG handover indication indicates that a handover is being requested, the distinguishable connection establishment message is configured to indicate to the TWAG that an IP address assigned to the UE during the PDN connection formed via the eNodeB is to be preserved when the handover has switched the connection to the TWAG-routed PDN connection.

Example 10 may be the subject matter of any one or more of Examples 1 to 9, wherein the connection requesting module is configured to indicate to the TWAG in the distinguishable-connection establishment message that the requested connection corresponds to a further connection, to be set up to operate substantially simultaneously with a previously-established initial TWAG-routed connection.

Example 11 may be the subject matter of any one or more of Examples 1 to 10, wherein the distinguishable-connection establishment message is communicated from the UE to the TWAG as a payload of an L2 frame.

Example 12 may be the subject matter of Example 11, wherein the distinguishable-connection establishment message is communicated from the UE to an Access Point using one of IEEE 802.11 action frames, a Generic Advertisement protocol and a dedicated L2 frame ethertype and is communicated from the Access Point to the TWAG using the dedicated L2 frame ethertype.

Example 13 may be the subject matter of any one or more of Examples 1 to 12, wherein the distinguishable-connection control message is communicated from the UE through to the TWAG as a payload of at least one L3 frame.

Example 14 may be the subject matter of Example 13, wherein the L3 frame uses one of a User Datagram Protocol, Transmission Control Protocol and a Point-to-Point Protocol.

Example 15 may be the subject matter of any one or more of Examples 1 to 14, comprising a user plane connection management module configured to use the unique virtual interface gateway address used by the connection setup module to identify a point-to-point link between the UE and the TWAG, as a user plane identifier for tagging a user-plane data flow between the UE and the TWAG corresponding to the point-to-point link.

Example 16 may be the subject matter of Example 15, wherein the user plane connection management module comprises
  a packet generating module configured to generate uplink Internet Protocol packets encapsulated in data frames for output to the TWLAN, uplink data frames having a destination address field comprising the user plane connection identifier;
  a packet receiving module configured to receive from the TWLAN, downlink data frames having a source address field identifying a source of an Internet Protocol packet encapsulated in the downlink data frame, the source corresponding to one of an NSWO connection and a PDN connection.

Example 17 is, in a wireless communications network capable of wireless communication using an eNodeB and capable of wireless communication using a Trusted Local Wireless Access Network having a Trusted Wireless Access Gateway, a method of transmitting multiple-connection management messages from a UE to the TWAG, the method comprising:

sending a communication setup message from the UE to the TWAG to setup one of a 3GPP TWAG connection and a non-3GPP TWAG connection;

establishing by interacting with the TWAG, a unique connection identifier for assignment to a communication path between the TWAG and the UE, the unique connection identifier being accessible to the TWAG, for uniquely distinguishing the corresponding communication path from any other potentially simultaneous communication paths between the TWAG and a UE;

attaching the UE to the TWAG via the communication path having the unique connection identifier to implement the requested TWAG connection.

Example 18 may be the subject matter of Example 17, wherein the unique connection identifier comprises one of a gateway Medium Access Control (MAC) address or VLAN Id and a gateway Internet Protocol (IP) address.

Example 19 is Trusted Wireless access gateway (TWAG) for a wireless communication network, the TWAG being configured to form a connection with a UE and to provide access to at least one of a 3GPP PDN gateway and an NSWO gateway, the TWAG comprising:

a receiving module configured to receive from the UE a TWAG-connection request message requesting establishment of at least one of a PDN connection and an NSWO connection;

a TWAG connection establishing module configured to assign a distinct virtual interface identifier to the requested TWAG-connection and to communicate the distinct virtual interface identifier in a response message to the UE, for use by the UE in performing a Layer 3 attachment procedure.

Example 20 may be the subject matter of Example 19, wherein, when the TWAG-connection request message specifies that an NSWO connection is requested, the TWAG connection establishing module is configured to assign at least one local resource corresponding to the NSWO gateway to the requested TWAG connection.

Example 21 may be the subject matter of any one or more of Examples 19 and 20, wherein when the connection request message comprises an indication that the connections correspond to a handover from a PDN gateway connection formed via an eNodeB, the TWAG connection establishing module is configured to send a create session request message having a handover indication to the PDN gateway and configured to request reallocation to the UE of the same IP address as was allocated to the UE before the handover.

Example 22 may be the subject matter of claim 21, wherein the Create Session Request message sent by the TWAG to the PDN gateway comprises an Access Point Name identifying which PDN connection is to be handed over to the TWAG.

Example 23 is connection attachment circuitry for a User Equipment (UE) for use in a wireless communications network configurable to offload communication of data from the cellular radio-access network to a Trusted Wireless Local Access Network (TWLAN) comprising a Trusted Wireless Access Gateway (TWAG), the connection attachment circuitry comprising:

a capability exchange module configured to send to the TWAG at least one UE TWLAN connection capability parameter indicating whether the UE is capable of supporting at least one of: (i) a single-connection mode permitting a single gateway connection between the UE and the TWAG; (ii) a multiple-connection mode permitting a plurality of substantially simultaneous gateway connections between the UE and the TWAG; and (iii) non-seamless TWLAN offload;

a connection establishing module configured to receive from the TWAG an indication of whether the TWAG is configurable to support at least a subset of features indicated by the at least one UE TWLAN connection capability parameter and to establish a communication mode between the UE and the TWLAN depending upon the indication.

Example 24 may be the subject matter of Example 23, wherein the capability exchange module is configurable to send the at least one UE TWLAN connection capability parameter to the TWAG as part of an authentication procedure between the UE and the TWAG.

Example 25 may be the subject matter of any one or more of Examples 23 and 24, wherein when the UE is configured to operate in the multiple connection mode, the connection establishing module is configured to send a connection request to the TWAG specifying at least one connection attribute selected from: (i) an attribute specifying the connection comprises a handover attachment between a 3GPP gateway and a non-3GPP gateway; (ii) an attribute requesting a connection to a non-default Access Point Name; (iii) an attribute specifying whether the connection is a 3GPP connection or a non-3GPP connection; (iv) an attribute specifying a Packet Data Network Type; (v) an attribute specifying protocol configuration options; (vi) an attribute specifying a user plane connection identifier; and (v) an attribute specifying a control plane connection identifier.

Example 26 is a computer program product embodied on a non-transitory computer-readable medium comprising program instructions configured such that when executed by processing circuitry cause the processing circuitry to implement the method of claim 17 or claim 18.

Example 27 is a User Equipment for use in a cellular wireless communications network configurable to offload communication of packet data from a cellular radio-access network to a Trusted Wireless Local Access Network (TWLAN) comprising a Trusted Wireless Access Gateway (TWAG), the User Equipment comprising:

a WLAN network interface card (NIC) for wireless communication with the TWLAN;

a WLAN NIC miniport configured to communicate with a PDN gateway and an NSWO gateway to exchange with the UE capabilities characteristic of a TWLAN-routed connection;

a plurality of virtual miniports corresponding to a respective plurality of substantially simultaneous TWLAN-routed connections, each connection having a unique identifier visible to the TWAG;

a simultaneous-connection driver configured to mediate access to the WLAN NIC by the plurality of virtual miniports.

Example 28 may be the subject matter of Example 27, wherein the plurality of virtual miniports are belong to a protocol layer between a TCP/IP transport layer and a layer corresponding to the simultaneous-connection driver.

Example 29 is a computer program product for execution on a UE, embodied on a non-transitory computer-readable medium comprising:

Trusted Wireless Local Area Network (TWLAN) offload driver code for driving a plurality of substantially simultaneous packet data connections having respective point-to-point links between the UE and a Trusted Wireless Access Gateway, the TWLAN offload driver code using a unique virtual interface identifier to distinguish between the plurality of substantially simultaneous packet data connections, the TWLAN offload driver code having virtual miniport generating code, responsive to an indication that a new point-to-point link between the TWAG and the UE is required, to generate a virtual miniport corresponding to the new point-to-point link, the virtual miniport providing virtualized access to a WLAN network interface device of the UE.

Example 30 may be the subject matter of Example 29, wherein the TWLAN offload driver code comprises a multiple connection handling protocol having a characteristic L2 ethertype.

Example 31 is a User Equipment (UE) for use in an Long Term Evolution cellular wireless communications network configurable to offload communication of packet data from a cellular radio-access network to a Trusted Wireless Local Access Network (TWLAN), the UE comprising at least one of the connection attachment circuitry of Example 1 and the capability exchange circuitry of Example 23.

Example 32 is connection control circuitry for a User Equipment (UE) for use in a cellular wireless communications network configurable to offload communication of packet data from a cellular radio-access network comprising an Evolved Packet Core (EPC) to a Trusted Wireless Local Access Network (TWLAN) a Trusted Wireless Access Gateway (TWAG), the connection control circuitry comprising:
  means for requesting a connection configured to send a distinguishable-connection establishment message to the TWAG, the message requesting setup of a TWAG-routed data connection comprising at least one of a Packet Data Network (PDN) connection directed through an EPC PDN gateway and a Non-Seamless Wireless Offload (NSWO) connection directed through a non-3GPP gateway;
  means for setting up a connection configured to receive from the TWAG, in response to the distinguishable-connection establishment message, a unique virtual gateway interface address and configured to establish a point-to-point link between the UE and the TWAG, the point-to-point link being distinguishable from any other substantially simultaneous point-to-point link between the UE and the TWAG using the corresponding unique virtual gateway interface address.

Example 33 is connection attachment circuitry for a User Equipment (UE) for use in a wireless communications network configurable to offload communication of data from the cellular radio-access network to a Trusted Wireless Local Access Network (TWLAN) comprising a Trusted Wireless Access Gateway (TWAG), the connection attachment circuitry comprising:
  means for capability exchange configured to send to the TWAG at least one UE TWLAN connection capability parameter indicating whether the UE is capable of supporting at least one of: (i) a single-connection mode permitting a single gateway connection between the UE and the TWAG; (ii) a multiple-connection mode permitting a plurality of substantially simultaneous gateway connections between the UE and the TWAG; and (iii) non-seamless TWLAN offload;
  means for connection establishment configured to receive from the TWAG an indication of whether the TWAG is configurable to support at least a subset of features indicated by the at least one UE TWLAN connection capability parameter and to establish a communication mode between the UE and the TWLAN depending upon the indication.

Example 34 is computer readable medium comprising instructions, which, when executed, cause a processor to carry out the method of Example 17 or Example 18.

Example 35 is the computer readable medium of Example 34, the medium being one of a storage medium and a transmission medium.

The invention claimed is:

1. One or more non-transitory computer-readable media having instructions that, when executed by one or more processors, cause a User Equipment (UE) to:
  send, subsequent to performance of Extensible Authorization Protocol (EAP) authentication procedures by the UE and a Trusted Wireless Access Gateway (TWAG), a distinguishable-connection establishment message to the TWAG, the distinguishable-connection establishment message requesting setup of a TWAG-routed data connection comprising a Packet Data Network (PDN) connection directed through an Evolved Packet Core (EPC) PDN gateway or a Non-Seamless Wireless Offload (NSWO) connection directed through a non-3GPP gateway, wherein the distinguishable-connection establishment message includes a PDN signaling parameter to indicate that the TWAG-routed data connection is a second connection;
  receive from the TWAG, in response to the distinguishable-connection establishment message, a unique virtual gateway interface address, wherein the unique virtual gateway interface address is to distinguish a given connection from any other connection made by any UE connected to the TWAG; and
  establish a point-to-point link between the UE and the TWAG, the unique virtual gateway interface address to distinguish the point-to-point link from any other simultaneous point-to-point link between any UE and the TWAG.

2. The one or more computer-readable media of claim 1, wherein the distinguishable-connection establishment message is a request message comprising at least one TWAG-routed data connection attribute selected from: a handover indication for handover between an NSWO connection and a PDN connection; an initial attach indication; a choice between NSWO connection and PDN connection; a DE-specified Access Point Name; a Packet Data Network type; a user plane connection identifier; a control plane connection identifier; a protocol configuration option; and an indication of whether Internet protocol address preservation is required for a handover connection.

3. The one or more computer-readable media of claim 1, wherein the response received from the TWAG comprises, in addition to the unique virtual gateway interface address, an Access Point name selected by a Trusted Wireless Local Access Network (TWLAN).

4. The one or more computer-readable media of claim 1, wherein the unique virtual gateway interface address used to identify the point-to-point link comprises one of a gateway Medium Access Control (MAC) address and a gateway Internet Protocol (IP) address.

5. The one or more computer-readable media of claim 1, wherein the instructions, when executed, further cause the UE to perform one of IPv4 address configuration and IPv6 address configuration using the unique virtual gateway interface address to form a Dynamic Host Configuration Protocol (DHCP) request in a case of an IPv4 address configuration and to optionally form a Router Solicitation in a case of an IPv6 configuration.

6. The one or more computer-readable media of claim 1, wherein the instructions, when executed, further cause the UE to indicate to the TWAG in the distinguishable connection establishment message that the requested TWAG-routed data connection corresponds to a 3GPP-TWAG handover between a connection with a PDN gateway established via an eNodeB and one of: a TWAG-routed data connection comprising one of: a Packet Data Network (PDN) connection directed through an EPC PDN gateway; and a Non-Seamless Wireless Offload (NSWO) connection directed through a non-3GPP gateway.

7. The one or more computer-readable media of claim 6, wherein when a 3GPP-TWAG handover indication indicates that a handover is being requested, the distinguishable connection establishment message is configured to indicate to the TWAG that an IP address assigned to the UE during the PDN connection formed via the eNodeB is to be preserved when the handover has switched the connection to a TWAG-routed PDN connection.

8. The one or more computer-readable media of claim 1, wherein the second connection is to be set up to operate substantially simultaneously with a previously-established initial TWAG-routed connection.

9. The one or more computer-readable media of claim 1, wherein the distinguishable-connection establishment message is communicated from the UE to the TWAG as a payload of an L2 frame.

10. The one or more computer-readable media of claim 9, wherein the distinguishable-connection establishment message is communicated from the UE to an Access Point using one of IEEE 802.11 action frames, a Generic Advertisement protocol and a dedicated L2 frame ethertype and is communicated from the Access Point to the TWAG using the dedicated L2 frame ethertype.

11. The one or more computer-readable media of claim 1, wherein the distinguishable-connection establishment message is communicated from the UE through to the TWAG as a payload of at least one L3 frame.

12. The one or more computer-readable media of claim 11, wherein the L3 frame uses one of a User Datagram Protocol, Transmission Control Protocol and a Point-to-Point Protocol.

13. The one or more computer-readable media of claim 1, wherein the instructions, when executed, further cause the UE to use the unique virtual interface gateway address used to identify a point-to-point link between the UE and the TWAG, as a user plane connection identifier for tagging a user-plane data flow between the UE and the TWAG corresponding to the point-to-point link.

14. The one or more computer-readable media of claim 13, wherein the instructions, when executed, further cause the UE to:
generate uplink Internet Protocol packets encapsulated in data frames for output to the TWLAN, uplink data frames having a destination address field comprising the user plane connection identifier; and
receive from the TWLAN, downlink data frames having a source address field identifying a source of an Internet Protocol packet encapsulated in the downlink data frame, the source corresponding to one of an NSWO connection and a PDN connection.

15. In a wireless communications network capable of wireless communication using an eNodeB and capable of wireless communication using a Trusted Local Wireless Access Network having a Trusted Wireless Access Gateway (TWAG), a method of transmitting a multiple-connection management message from a user equipment (UE) to the TWAG, the method comprising:
sending, subsequent to performance of Extensible Authorization Protocol (EAP) authentication procedures by the UE and the TWAG, a communication setup message from the UE to the TWAG to setup one of a 3GPP TWAG connection and a non-3GPP TWAG connection, wherein a distinguishable-connection establishment message includes a Packet Data Network signaling parameter to indicate that the 3GPP TWAG connection or the non-3GPP TWAG connection is a second connection;
establishing by interacting with the TWAG, a unique connection identifier for assignment to a communication path between the TWAG and the UE, the unique connection identifier being accessible to the TWAG, for uniquely distinguishing the communication path from any other potentially simultaneous communication paths between the TWAG and a UE, wherein the unique connection identifier is to distinguish a given connection from any other connection made by any UE connected to the TWAG; and
attaching the UE to the TWAG via the communication path having the unique connection identifier to implement the requested TWAG connection.

16. The method of claim 15, wherein the unique connection identifier comprises one of a gateway Medium Access Control (MAC) address or VLAN Id and a gateway Internet Protocol (IP) address.

17. Connection attachment circuitry for a User Equipment (UE) for use in a wireless communications network configurable to offload communication of data from a cellular radio-access network to a Trusted Wireless Local Access Network (TWLAN) comprising a Trusted Wireless Access Gateway (TWAG), the connection attachment circuitry comprising:
a capability exchange module configured to send to the TWAG at least one UE TWLAN connection capability parameter indicating whether the UE is capable of supporting: (i) a single-connection mode permitting a single gateway connection between the UE and the TWAG; (ii) a multiple-connection mode permitting a plurality of simultaneous gateway connections between the UE and the TWAG; or (iii) non-seamless TWLAN offload,
a connection establishing module configured to receive from the TWAG an indication of whether the TWAG is configurable to support at least a subset of features indicated by the at least one UE TWLAN connection capability parameter and to establish a communication mode between the UE and the TWLAN depending upon the indication,
wherein when the UE is configured to operate in the multiple-connection mode, wherein the connection establishing module is configured to send, subsequent to performance of Extensible Authentication Protocol (EAP) authentication procedures by the UE and the TWAG, a connection request to the TWAG that includes a Packet Data Network signaling indication that the connection is a second connection, and
wherein an identifier is to distinguish a given connection from any other connection made by any UE connected to the TWAG.

18. The connection attachment circuitry of claim 17, wherein the capability exchange module is configurable to send the at least one UE TWLAN connection capability parameter to the TWAG as part of an authentication procedure between the UE and the TWAG.

19. The connection attachment circuitry of claim 17, wherein when the UE is configured to operate in the multiple connection mode, the connection establishing module is configured to send a connection request to the TWAG specifying at least one connection attribute selected from: (i) an attribute specifying the connection comprises a handover attachment between a 3GPP gateway and a non-3GPP gateway; (ii) an attribute requesting a connection to a non-default Access Point Name; (iii) an attribute specifying whether the connection is a 3GPP connection or a non-3GPP connection; (iv) an attribute specifying a Packet Data Network Type; (v) an attribute specifying protocol configuration options; (vi) an attribute specifying a user plane connection identifier; and (v) an attribute specifying a control plane connection identifier.

20. A User Equipment for use in a cellular wireless communications network configurable to offload communication of packet data from a cellular radio-access network to a Trusted Wireless Local Access Network (TWLAN) comprising a Trusted Wireless Access Gateway (TWAG), the User Equipment comprising:
  a WLAN network interface card (NIC) for wireless communication with the TWLAN;
  a WLAN NIC miniport configured to communicate with a PDN gateway and an NSWO gateway to exchange with the UE a capabilities characteristic of a TWLAN-routed connection;
  a plurality of virtual miniports corresponding to a respective plurality of simultaneous TWLAN-routed connections, each connection having a unique identifier visible to the TWAG, wherein the unique identifier is to distinguish a given connection from any other connection made by any UE connected to the TWAG; and
  a simultaneous-connection driver configured to mediate access to the WLAN NIC by the plurality of virtual miniports.

21. The User Equipment of claim 20, wherein the plurality of virtual miniports are belong to a protocol layer between a TCP/IP transport layer and a layer corresponding to the simultaneous-connection driver.

22. A User Equipment (UE) for use in an Long Term Evolution cellular wireless communications network configurable to offload communication of packet data from a cellular radio-access network to a Trusted Wireless Local Access Network (TWLAN), the UE comprising the one or more computer-readable media of claim 1 or the connection attachment circuitry of claim 17.

23. Connection control circuitry for a User Equipment (UE) for use in a cellular wireless communications network configurable to offload communication of packet data from a cellular radio-access network comprising an Evolved Packet Core (EPC) to a Trusted Wireless Local Access Network (TWLAN) a Trusted Wireless Access Gateway (TWAG), the connection control circuitry comprising:
  means for requesting a connection configured to send, subsequent to performance of Extensible Authorization Protocol (EAP) authentication procedures by the UE and the TWAG, a distinguishable-connection establishment message to the TWAG, the distinguishable-connection establishment message requesting setup of a TWAG-routed data connection comprising a Packet Data Network (PDN) connection directed through an EPC PDN gateway or a Non-Seamless Wireless Offload (NSWO) connection directed through a non-3GPP gateway, wherein the distinguishable-connection establishment message includes a PDN signaling parameter to indicate that the TWAG-routed data connection is a second connection; and
  means for setting up a connection configured to receive from the TWAG, in response to the distinguishable-connection establishment message, a unique virtual gateway interface address, wherein the unique virtual gateway interface address is to distinguish a given connection from any other connection made by any UE connected to the TWAG, and configured to establish a point-to-point link between the UE and the TWAG, the point-to-point link being distinguishable from any other substantially simultaneous point-to-point link between the UE and the TWAG using the unique virtual gateway interface address.

24. Connection attachment circuitry for a User Equipment (UE) for use in a wireless communications network configurable to offload communication of data from a cellular radio-access network to a Trusted Wireless Local Access Network (TWLAN) comprising a Trusted Wireless Access Gateway (TWAG), the connection attachment circuitry comprising:
  means for capability exchange configured to send to the TWAG at least one UE TWLAN connection capability parameter indicating whether the UE is capable of supporting: (i) a single-connection mode permitting a single gateway connection between the UE and the TWAG; (ii) a multiple-connection mode permitting a plurality of substantially simultaneous gateway connections between the UE and the TWAG; or (iii) non-seamless TWLAN offload, wherein when the UE is configured to operate in the multiple connection mode, a connection establishing module is configured to send, subsequent to performance of Extensible Authorization Protocol (EAP) authentication procedures by the UE and the TWAG, a connection request to the TWAG that includes a Packet Data Network signaling indication that a requested connection is a second connection, wherein a unique identifier is to distinguish a given connection from any other connection made by any UE connected to the TWAG; and
  means for connection establishment configured to receive from the TWAG an indication of whether the TWAG is configurable to support at least a subset of features indicated by the at least one UE TWLAN connection capability parameter and to establish a communication mode between the UE and the TWLAN depending upon the indication.

* * * * *